United States Patent [19]

Besaw et al.

[11] Patent Number: 5,276,789
[45] Date of Patent: Jan. 4, 1994

[54] GRAPHIC DISPLAY OF NETWORK TOPOLOGY

[75] Inventors: Lawrence M. Besaw; Jeff C. Wu, both of Ft. Collins, Colo.; Cho Y. Chang, Burlington, Mass.; Darren D. Smith; Mark J. Kean, both of Ft. Collins, Colo.

[73] Assignee: Hewlett-Packard Co., Palo Alto, Calif.

[21] Appl. No.: 523,168

[22] Filed: May 14, 1990

[51] Int. Cl.$^5$ .............................................. G06F 15/62
[52] U.S. Cl. ..................... 395/140; 395/155; 395/160; 395/161
[58] Field of Search . 395/155-161, 138, 139, 140-143

[56] References Cited

U.S. PATENT DOCUMENTS

| | | | |
|---|---|---|---|
| 4,845,633 | 7/1989 | Furtek | 395/161 |
| 4,953,106 | 10/1990 | Gansner et al. | 395/160 |
| 5,072,412 | 12/1991 | Henderson, Jr. et al. | 395/159 |
| 5,136,690 | 8/1992 | Becker et al. | 395/161 |

OTHER PUBLICATIONS

Bouloutas et al., "Some Graph Partitioning Problems and Algorithms Related to Routing in Large Computer Networks", Int'l Conf on Distributed Computing Syst, Jun. 5 1989, p. 365.
Smith et al., "HP OpenView Windows: A User Interface for Network Management Solutions", Hewlett-Packard Journal, Apr. 1990, pp. 60-65.
"Layout Algorithm for Computer Network Management Graphics", IBM Technical Disclosure Bulletin, vol. 30, No. 12, May 1988 pp. 268-277.

Primary Examiner—Mark K. Zimmerman
Assistant Examiner—Almis Jankus

[57] ABSTRACT

A system for automatically laying out and graphically displaying the topology of a computer network system. The layout system retrieves a list of the nodes within the network and their interconnections from a database which can be manually built by a network administrator or automatically constructed by other software. The system will provide any of three views that can be requested by the user. An internet view is the largest and shows the interconnection of different networks. A network view can be shown for any of the networks described in the internet view. A network is comprised of segments and the system will display a view of the nodes connected to any one of the segments. The system will automatically update the view as new nodes become available in the database. This aspect of the system and allows the system to dynamically update the graph when the list of nodes is being supplied by other software. The system also allows the user to dynamically alter the graph by using a graphical input device to move any of the objects displayed on the graph.

36 Claims, 28 Drawing Sheets

GRAPHIC DISPLAY OF NETWORK TOPOLOGY

FIELD OF THE INVENTION

This invention relates to computer systems and more particularly to computer networks that interconnect computers. Even more particularly, the invention relates to graphically displaying the nodes connected to a computer network.

BACKGROUND OF THE INVENTION

Computer networks are collections of hardware and software that connect computers and allow them to send information from one computer to another electronically. A computer network is comprised of the physical hardware connections between the various computers, for example telephone lines or a coax cable, and the software used to send and receive data and to route the data to the selected computer on the network.

A local area network (LAN) is a network connection between computers in close proximity, typically less than one mile, and usually connected by a single cable such as coax cable. A wide area network (WAN) is a network of computers located at longer distances, often connected by telephone lines or satellite links. Network software may sometimes be used with both types of networks. For example, a popular network is the Department of Defense internetworking protocol suite, known as Transmission Control Protocol/Internet Protocol (TCP/IP). This system was originally developed by the Defense Advanced Research Projects Agency (DARPA) and has now been widely distributed to Universities and industry.

When a network is fast growing, that is, network elements or nodes are being added frequently, a network administrator may not know all of the nodes connected to the network. Also, a network administrator new to his or her job may not be familiar with the nodes on the network. Determining the nodes manually is a difficult problem. A second problem associated with a manual operation is the time necessary to draw a graph of the network. The nodes on a network and their interconnections are best displayed in a graphical format.

A network can be viewed from different perspectives, depending on the scope of the view desired. For example, if a network is connected to an internet, such as TCP/IP described above, one view of the network would be a very wide encompassing view of all nodes on the entire TCP network. A second view might be a view of those portions of a network within a local range, for example, within a particular site or building. A third view of a network, often called a segment, might be a view of the nodes attached to a particular local area network cable. Manually drawing a graphical representation of each of these views of a network is a very tedious and time-consuming problem. While a segment view of the nodes attached to it a particular LAN cable may not change very often, a network view encompassing an entire building or site may change more frequently, and an internet view usually changes very frequently. Updating each of these views on a manual graphical representation is extremely tedious. Furthermore, when a new node is added to the graph, the existing nodes on the graph may need to be moved in order to make room for the new node. For manual graphical representations, this also a very tedious procedure. If many new nodes are added to a network, the graph may need to be scaled in order to keep it within an acceptable size limit. For manual graphs, this involves an entire re-drawing of the graph. Lastly, manual graphing techniques cannot easily represent whether a node on a network is currently active or inactive.

There is need in the art then for a method of quickly displaying the nodes on a network. There is further need in the art for automatically redisplaying nodes periodically, as nodes activate and deactivate. A still further need is for graphically displaying different levels of a network to suit different needs of an administrator. Yet another need is to redisplay the graph each time a node is added or deleted.

SUMMARY OF THE INVENTION

It is an object of the invention to automatically layout the nodes, called vertices, and connections between nodes, called edges, of a network in graphical form.

It is another object is to provide three views of the network, an internet view showing the entire network, a network view showing a limited view, and a segment view showing nodes attached to a local portion of the network.

Another object of the invention to dynamically update the graphical layout as new vertices and edges are identified to the system.

Another object of the invention is to allow a user to graphically alter the layout by moving, using a graphical input device, any vertex within the layout.

Another object is to analyze the vertices of the layout to temporarily remove all vertices, called chains, having zero or one connection to other vertices on the layout.

Another object is to analyze the vertices of the network to group them into clusters.

Still another object is to move clusters with only one connection to another cluster and analyze each separated cluster independently.

A further object is to arrange the vertices of a cluster around the circumference of a circle.

A further object is to position connected vertices adjacent each other on the circumference of the circle.

A further object is to reintroduce the chains and position them outside the circumference of the circle.

A further object is to arrange the clusters into a row and column format for displaying the layout.

A still further object is to provide continuous scaling of the graphical display to always display the entire network.

The above and other objects of the invention are accomplished in a system for automatically laying out and graphically displaying the topology of a computer network system. The layout system retrieves a list of the nodes within the network and their interconnections from a database which can be manually built by a network administrator or automatically constructed by other software. The system will provide any of three views that can be requested by the user. An internet view is the largest and shows the interconnection of different networks. A network view can be shown for any of the networks described in the internet view. A network is comprised of segments and the system will display a view of the nodes connected to any one of the segments.

The system will automatically update the view as new nodes become available in the database. This is a very important aspect of the system and allows the system to dynamically update the graph when the list of nodes is being supplied by other software. The system also allows the user to dynamically alter the graph by using a graphical input device to move any of the objects displayed on the graph.

The network topology information, retrieved from the database, is converted into an undirected graph representation. The network is treated as an undirected graph consisting of a set of vertices and edges. The definition of what constitutes a vertex and an edge will differ depending upon which of the three views is being presented. In the internet view, networks and gateways that connect networks are considered vertices, and an edge signifies that a particular gateway has an interface on a network.

When first analyzing the topology information from the database, a recursive algorithm deletes all chains from the graph. The chains are removed in order to reduce the complexity of the number of vertices that need to be analyzed by the clustering algorithm. A chain is a vertex that has zero or one connections to other vertices on the graph. After removing the furthest vertex from a chain, the algorithm recursively examines all other vertices to determine if a new vertex is now the end of the chain. When a new end of a chain is found, it is also removed.

After reducing all the chains within the network topology, the remaining vertices are partitioned into clusters. This partitioning is performed by initially grouping all nodes into a single cluster, and then successively removing edges in an attempt to subdivide the cluster into two clusters. Each time an edge is removed, the topology is traced to determine whether every vertex can be reached from every other vertex. If at least one vertex cannot be reached, a break in the topology has been discovered, and the two sets of vertices are divided into two clusters. Each of the clusters is then examined to see if it can be further subdivided.

After the set of clusters has been determined, each of the clusters is laid out in a graphical format. Two transformations are applied to each of the clusters before that cluster is laid out. The first transformation is to find the vertex within the cluster that has the most connections, and make if the root of a tree. This root is then placed at the center of a circle, and the children connected below the root of tree are placed on the circumference of a circle drawn around the root vertex. A second transformation is to find vertices in the cluster that are connected to exactly two other vertices. If the two other principal vertices can be made contiguous on the cluster circle, then the first vertex is removed from the circumference of the circle and placed outside the two connection vertices. The first vertex will then appear between the other two vertices outside of the main cluster circle. This reduces the number of vertices on the main cluster circle.

After those transformations are applied, the principal vertices are laid out around the circumference of a circle. Any chains that were deleted in earlier processing are added outside of the circumference of the circle.

The final step is to arrange each of the clusters. The clusters are merged into a single coordinate space by arranging the clusters in a row-column fashion, and sliding each cluster toward the center to minimize the total space requirements of the final layout. The layout is then displayed in graphical format on a graphics output device.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
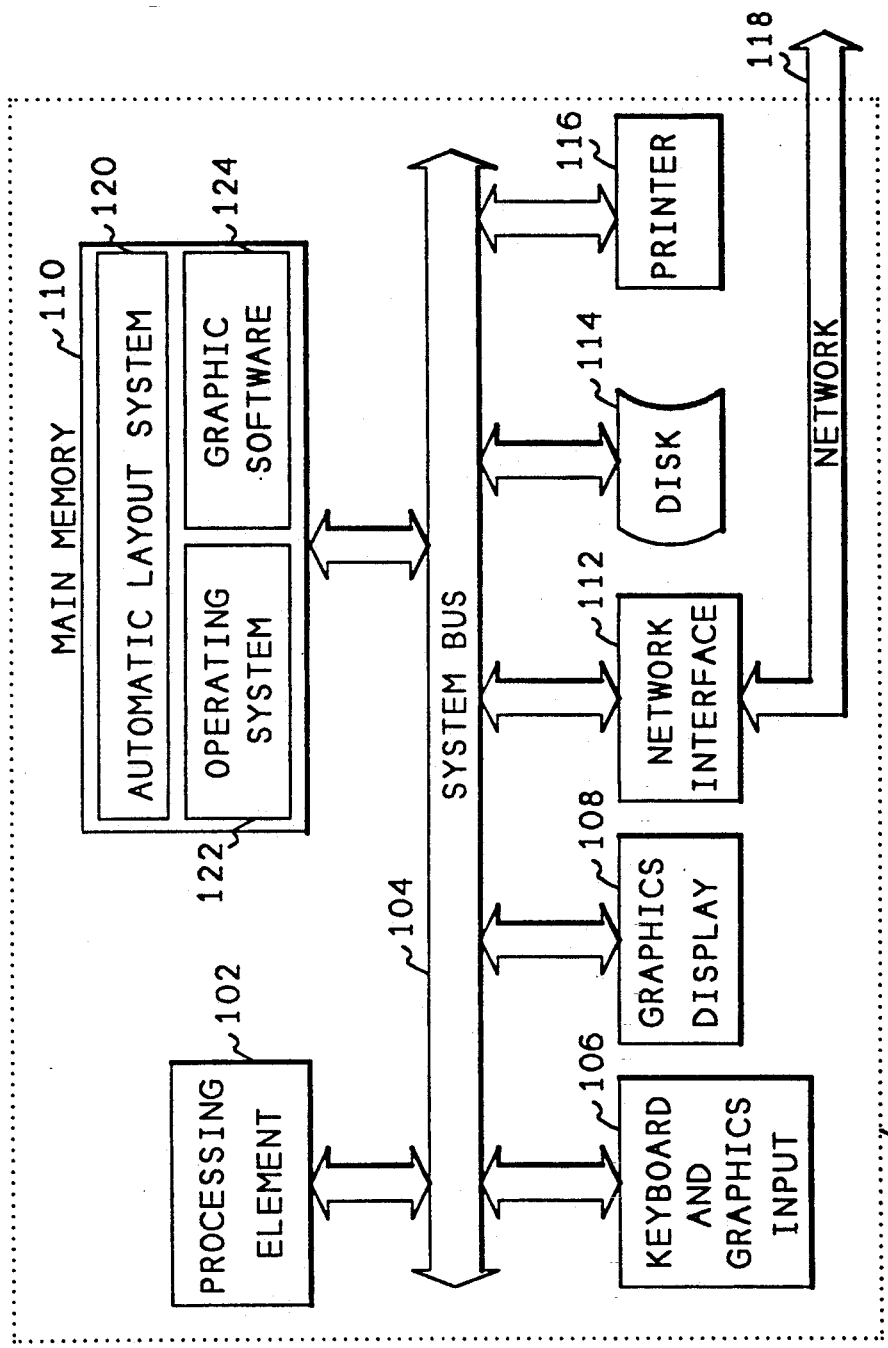
FIG. 1 shows a block diagram of a computer system including the system of the present invention.

FIG. 1 shows a block diagram of the computer hardware that contains the automatic layout system of the present invention. Referring now to FIG. 1, a computer system 100 contains a processing element 102. The processing element 102 communicates to other elements within the computer system 100 over a system bus 104. A keyboard 106 is used to input information from a user of the system, and a display 108 is used to output information to the user. A network interface 112 is used to interface the system 100 to a network 118 to allow the computer system 100 to act as a node on a network and to allow other software in the computer system 100 to automatically discover other nodes on the network. A disk 114 is used to store the software of the automatic layout system of the present invention and to store the network database. A printer 116 can be used to provide a hard copy output of the layout of the network displayed by the system. A main memory 110 within the system 100 contains the automatic layout system 120 of the present invention. The automatic layout system 120 communicates with an operating system 122 and graphic display software 124 to perform the layout and display of a network.

Figure 2:
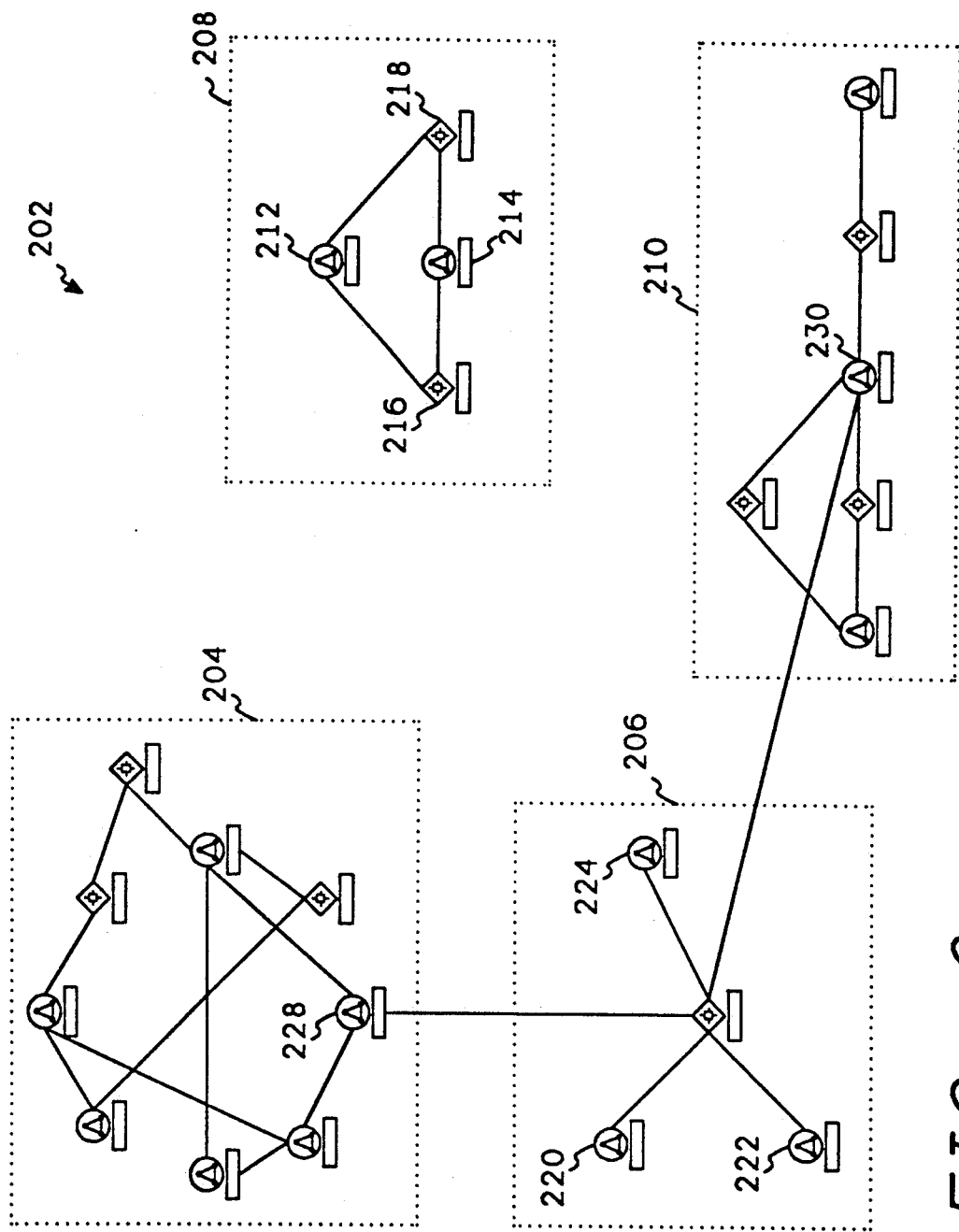
FIG. 2 shows a internet view of a network in a graphical form as produced by the system of the present invention.

FIG. 2 shows an internet view of a network in graphical form as produced by the system of the present invention. Referring now to FIG. 2, a network 202 is shown having four clusters: 204, 206, 208, and 210. Clusters 204, 206, and 210 are connected, while cluster 208 is not connected to the other clusters. Clusters 208 shows two networks 212 and 214 connected by two gateways: 216 and 218.

Cluster 206 is comprised of three networks: 220, 222, and 224, all connected by a gateway 226. The gateway 226 also connects the cluster 206 to a network 228 in cluster 204 and to network 230 in cluster 210.

Figure 3:
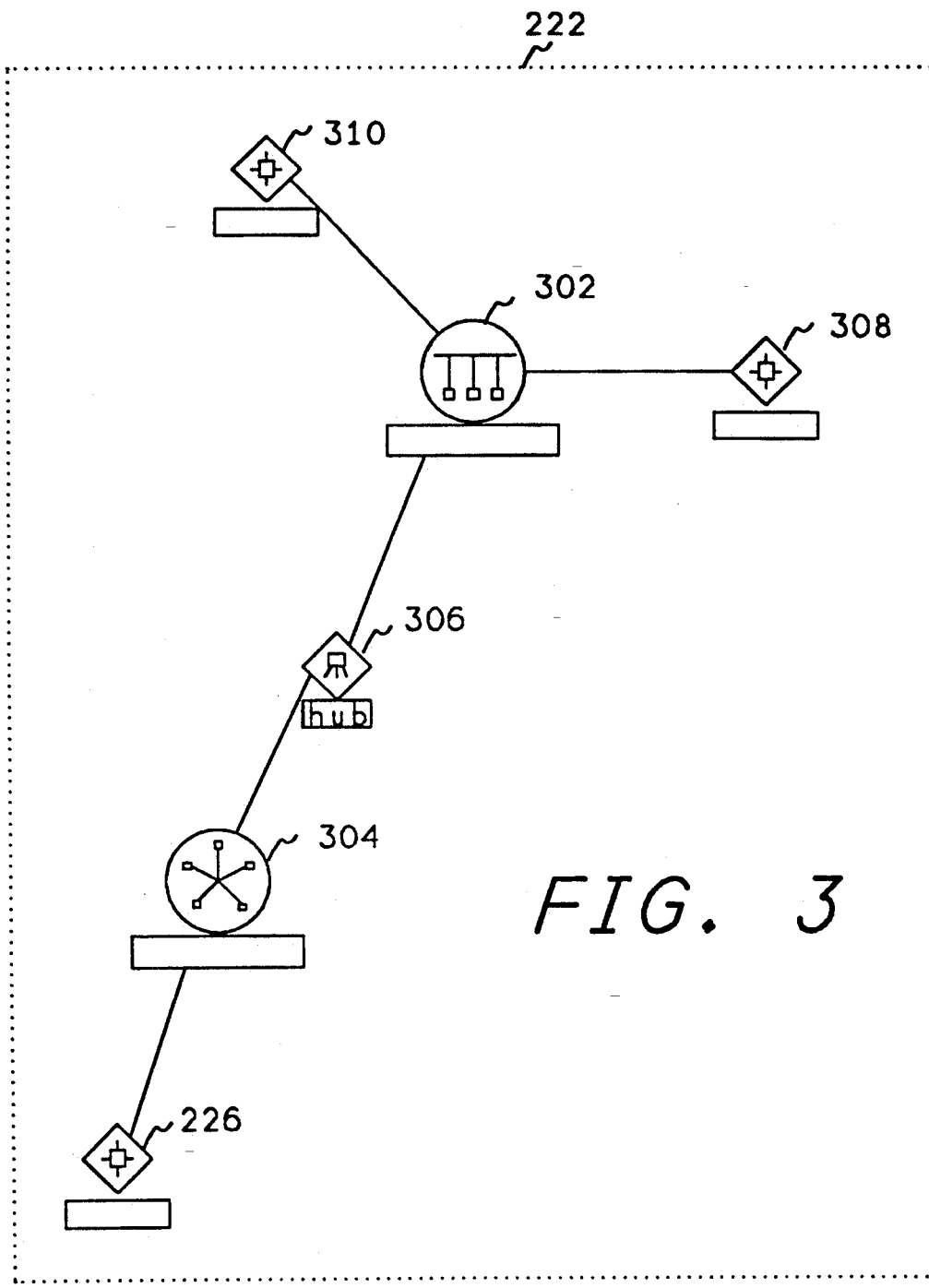
FIG. 3 shows a network view of a portion of the network of FIG. 2, in graphical form as produced by the system of the present invention.

FIG. 3 shows a network view of network 222 from FIG. 2. Referring now to FIG. 3, network 222 is comprised of segment one 302 and segment two 304. Segment two 304 is connected to other LANs within cluster 206 through gateway 226. Segment two 304 is connected to segment one 302 through a hub 306. Segment one 302 is also connected to gateways 308 and 310.

Figure 4:
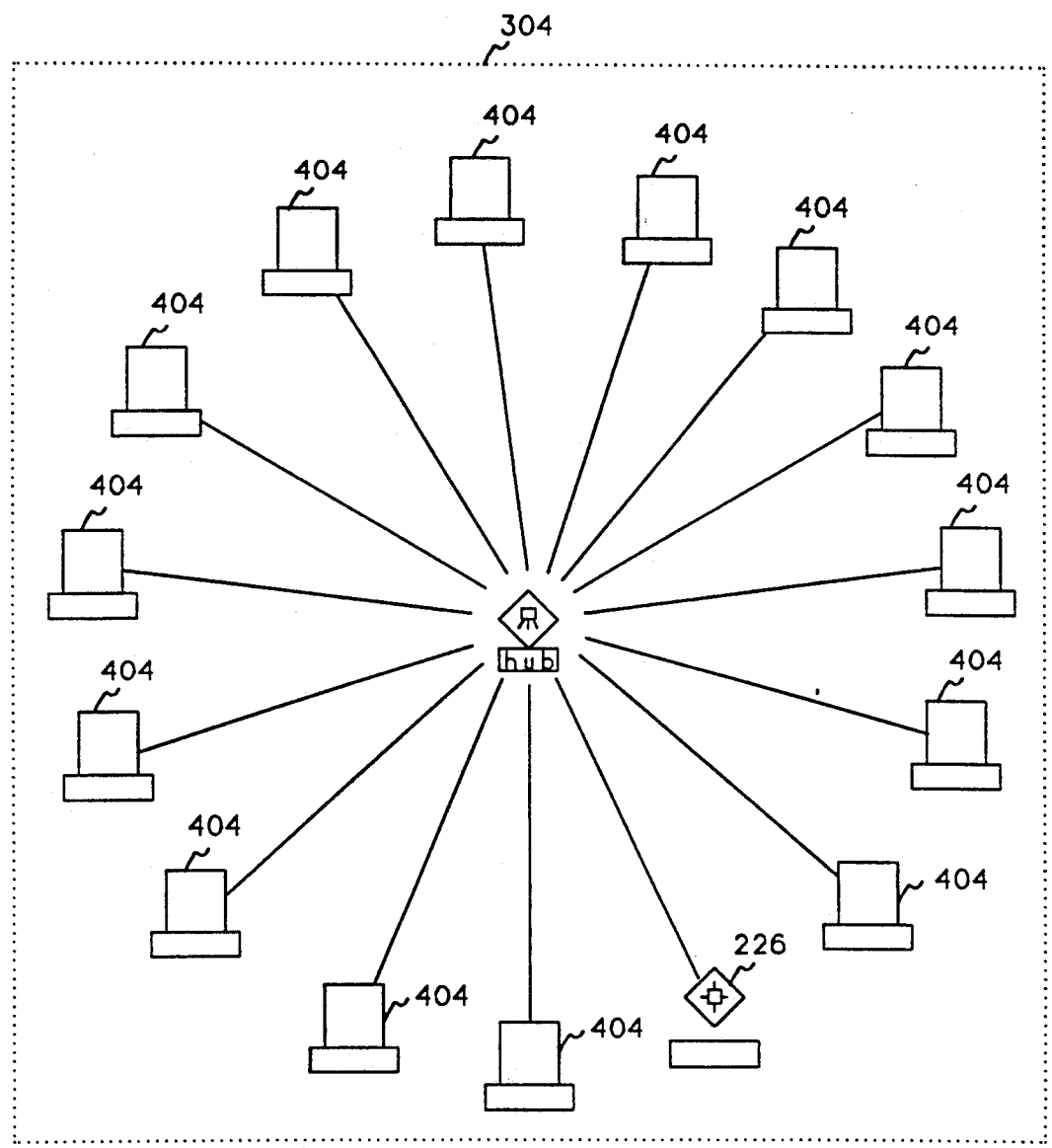
FIG. 4 shows a star segment view of one of the segments of FIG. 3, in graphical form as produced by the system of the present invention.

FIG. 4 shows a star segment view of segment two 304 of FIG. 3. Referring now to FIG. 4, segment two 304 is shown having a hub 402 which connects a plurality of nodes 404. The hub 402 is also connected to the gateway 226 which connects segment 304 to the other networks within cluster 206.

Figure 5:
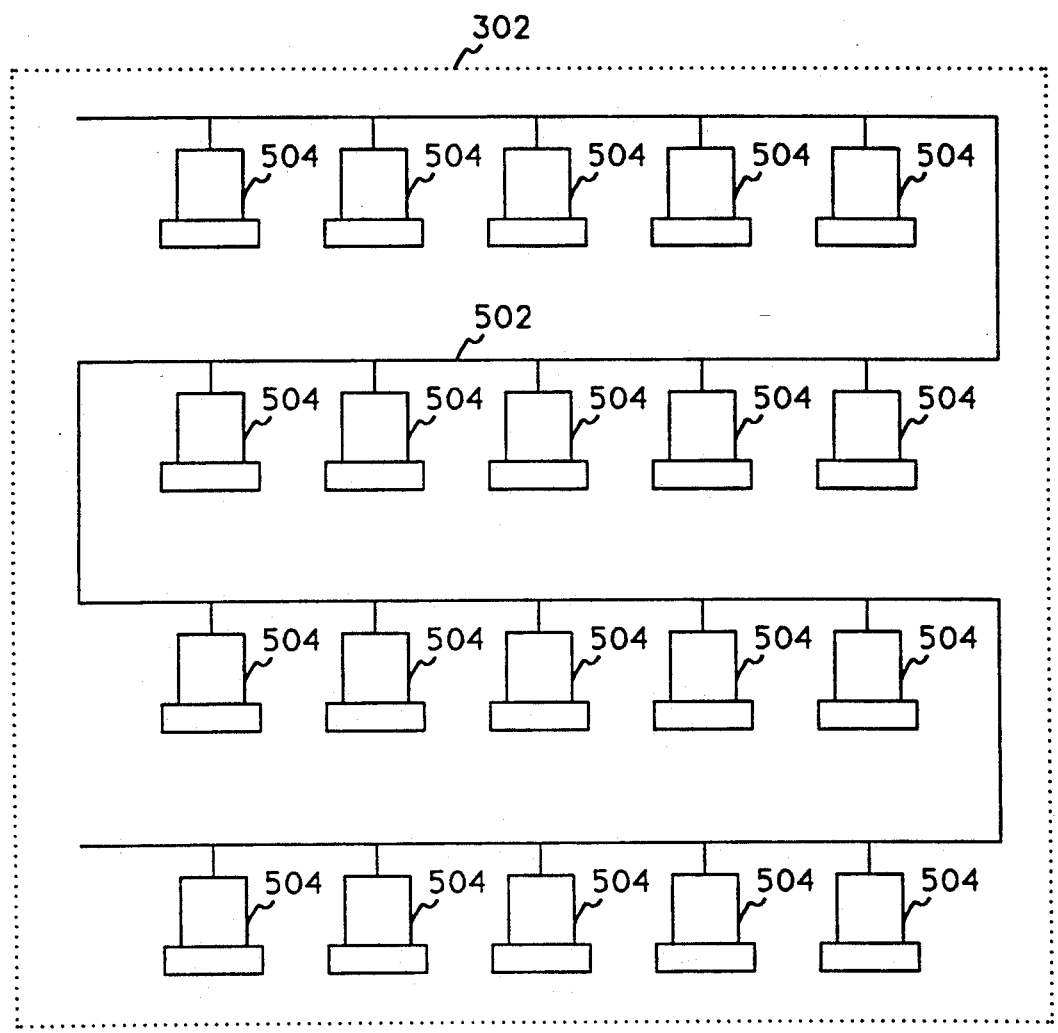
FIG. 5 shows a bus view of a segment of a network as produced by the system of the present invention.

FIG. 5 shows a bus view of segment one 302 of FIG. 3. Referring now to FIG. 5, a cable 502 is shown connecting a plurality of nodes 504. The method for laying out the bus segment view is comprised of attaching nodes 504 to cable 502 as it is drawn from left to right and then right to left in boustrophedon fashion.

Figure 6:
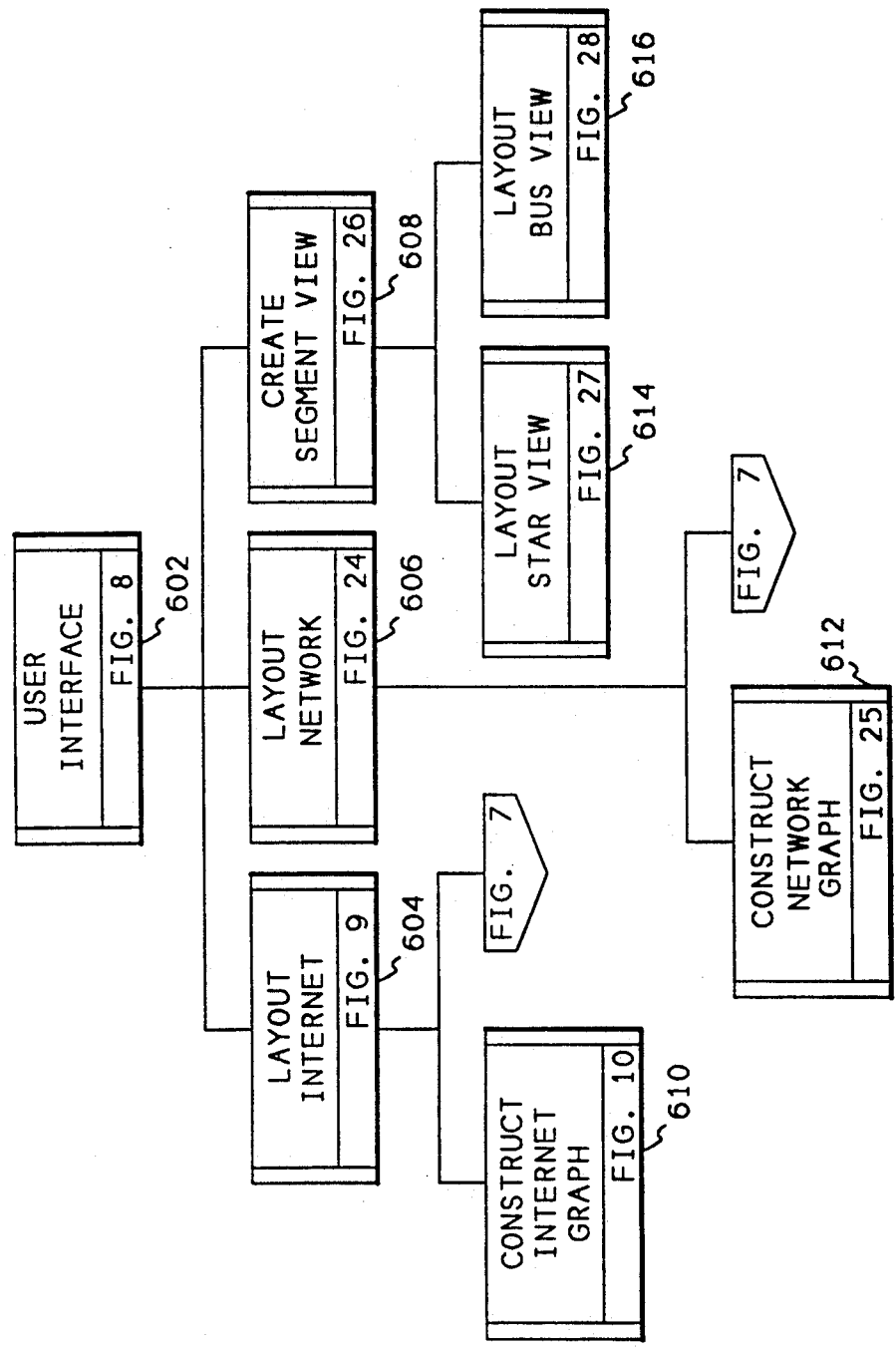
FIGS. 6 and 7 show a hierarchy diagram of the modules of the system of the present invention.
Figure 7:
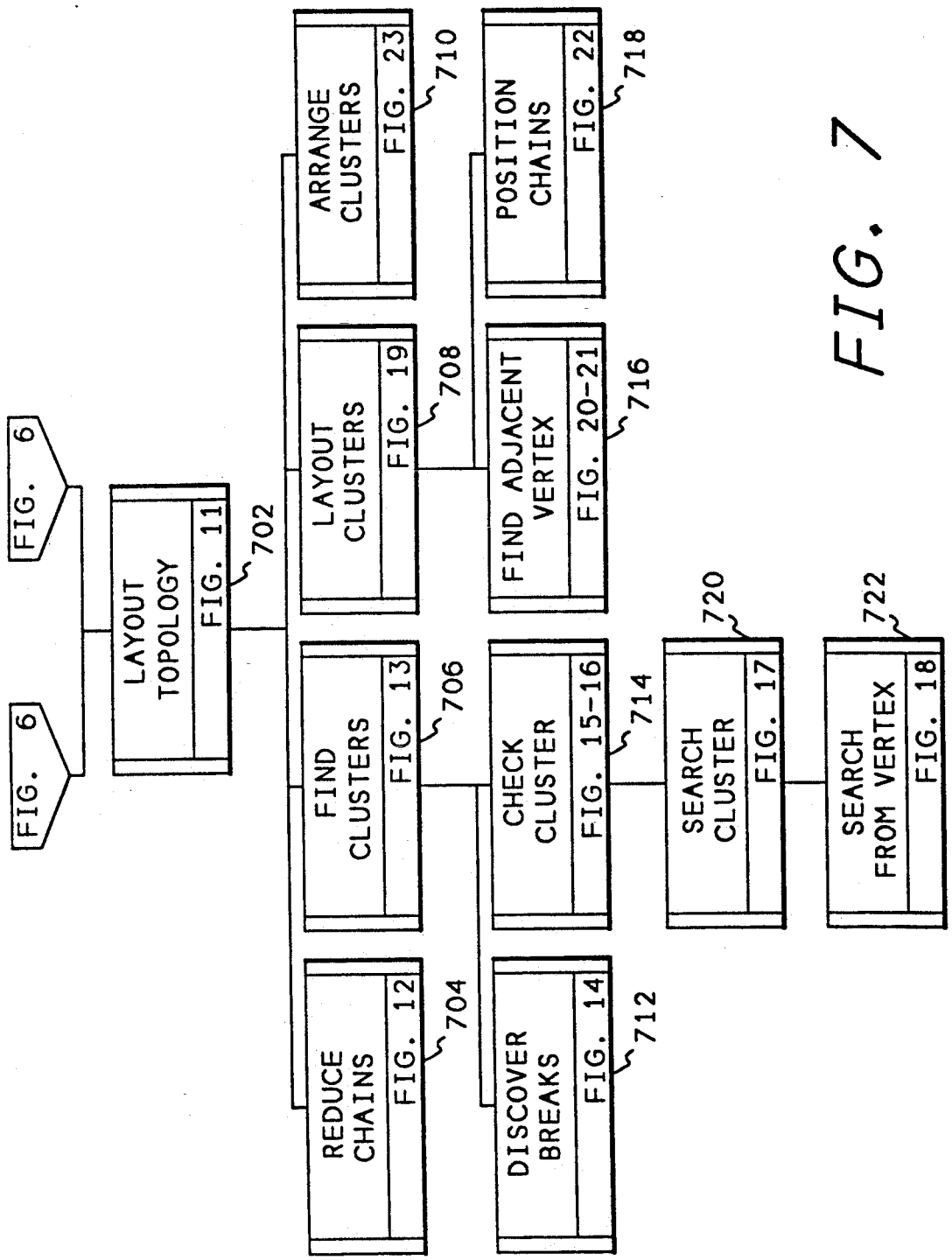

FIGS. 6 and 7 show a hierarchy diagram of the modules of the system of the present invention. Referring now to FIGS. 6 and 7, a user interface module 602 receives input from a graphical input device and determines which type of layout the user has requested. The user interface 602 also determines when a new node has been added to the network and automatically calls the correct layout module to update the graph. Layout internet module 604 produces an internet graph of the nodes of the network by calling construct internet graph 610 to initially define the networks within the graph, and by calling layout topology module 702 to complete the layout of the internet graph. Layout topology module 702 calls reduce chains module 704 to remove chains from the graph, and then calls find clusters module 706 to define the initial clusters within the graph. Find clusters 706 calls discover breaks module 712 which determines if the initial cluster is in fact more than one cluster. Check cluster module 712 temporarily removes edges from the graph and then calls search clusters 720 which calls search from vertex module 722 to determine if by removing the edge the cluster can be subdivided.

After all the clusters have been determined, layout topology module 702 calls layout cluster module 708 which places the vertices of a cluster on the graph. Layout cluster module 708 calls find adjacent vertex module 716 to determine the placement of the vertices with respect to each other, and it calls position chains module 718 to position the chains removed by reduce chains module 704. After each cluster is laid out, layout topology module 702 calls arrange clusters module 710 to arrange the clusters on the graph.

If the user requests a network layout, user interface 602 calls network layout module 606. In a network layout, each of the segments of the network are treated as vertices. Therefore, network layout is very similar to internet layout. Layout network module 606 calls construct network graph module 612 which determines all of the vertices that should be included in the network. Layout network module 606 then calls layout topology module 702 which performs in the same manner as it performs for constructing an internet graph.

If the user requests a segment view of one of the segments of a network, user interface module 602 calls create segment view module 608. Create segment view module 608 determines whether the segment can be represented by a star view or must be represented by a bus view. If the segment can be represented by a star view, create segment view module 608 calls layout star view module 614. Otherwise, create segment view module 608 calls layout bus view module 616.

The following description will be of the flowcharts for each of modules described above. The flowchart for a particular module is shown as a FIGURE number within the box of the module in FIGS. 6 and 7.

Figure 8:
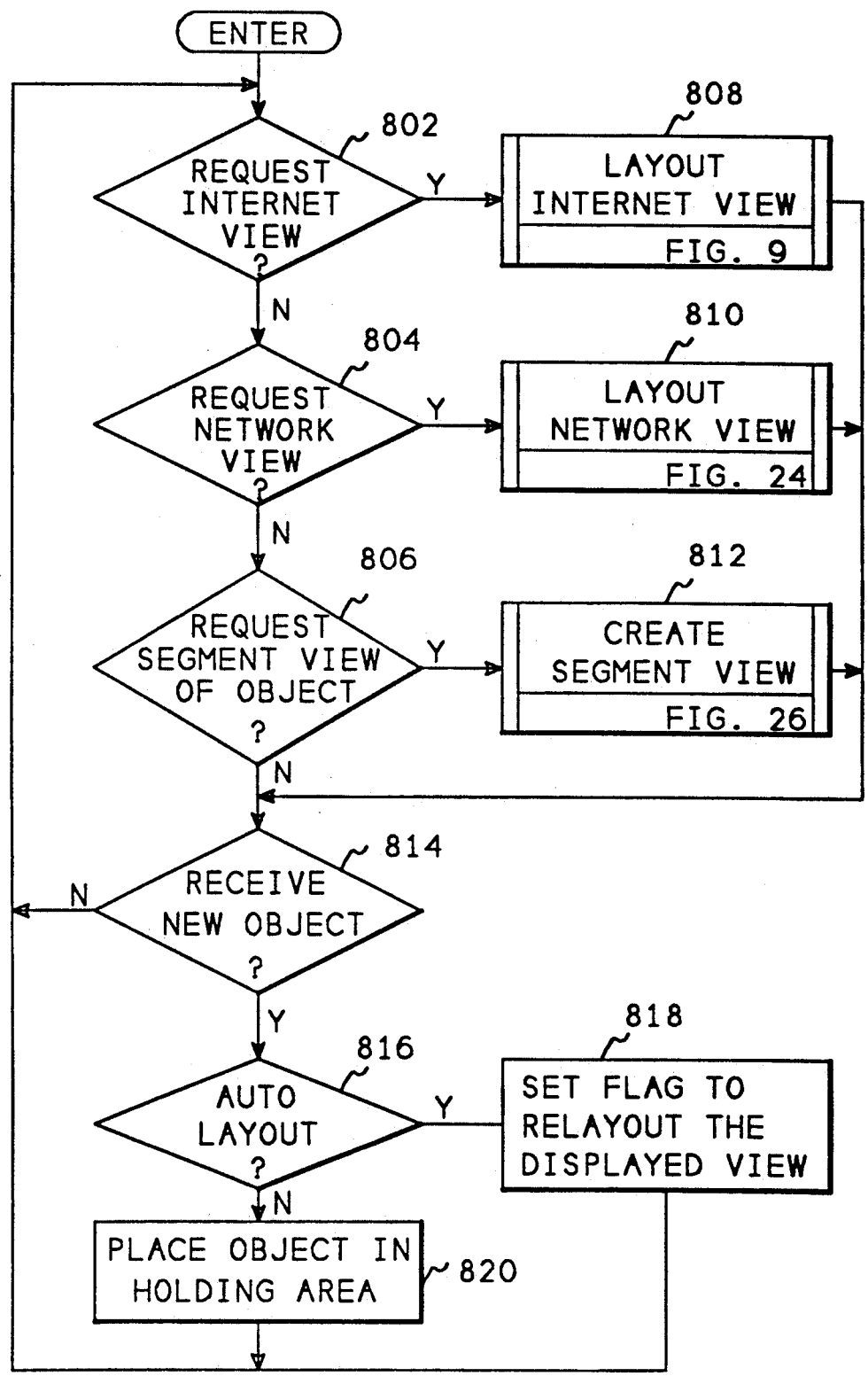
FIG. 8 is a flowchart of the user interface module of the automatic layout system of the invention.

FIG. 8 is a flowchart of the user interface module 602. Referring now FIG. 8, after entry, block 802 determines whether the user has requested an internet view, or whether a new object has been received and autolayout is on. If either case is true, block 802 transfers to block 808 which calls FIG. 9 to lay out the internet view. If an internet view has not been requested, block 802 transfers to block 804 to determine whether the user has requested a network view, or whether a new object has been received and auto-layout is on. If either is true, block 808 transfers to block 810 which calls FIG. 24 to lay out a network view. If a network view has not been requested, block 804 transfers to block 806 to determine whether the user has requested a segment view, or whether a new object has been received and autolayout is on. If either case is true, block 806 transfers to block 812 which calls FIG. 26 to create a segment view. If none of these has been requested, or after laying out one of the three views, control transfers to block 814 which determines whether a new object has been received. If a new object, such as a new network, new segment, or new node, has been received, block 814 transfers to block 816 which determines whether autolayout is in effect. If autolayout is in effect, block 816 transfers to block 818 which sets a flag to re-layout the view that is currently displayed. If autolayout has not been requested, block 816 transfers to block 820 which places the object into a holding area on the screen. This holding area is typically to one side or the bottom of the screen and a user can subsequently use the graphic input device to move the object from the holding area to the graph. After setting the flag or placing the object in the holding area, or if no new object has been received, control transfers back to block 802 to continue the loop.

Figure 9:
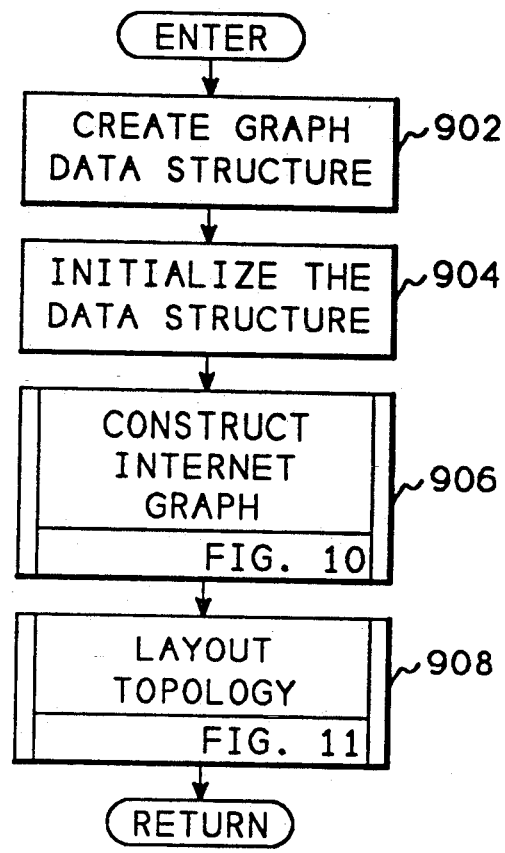
FIG. 9 is a flowchart of the internet layout module of the invention.

FIG. 9 shows a flowchart of the internet layout module block 604 of FIG. 6. Referring now to FIG. 9, after entry, block 902 creates a data structure for the graph. Block 904 then initializes the data structure, and block 906 calls FIG. 10 to determine the vertices that will be placed in the graph. After returning from FIG. 10, block 908 calls FIG. 11 to lay out the topology before returning to FIG. 8.

Figure 10:
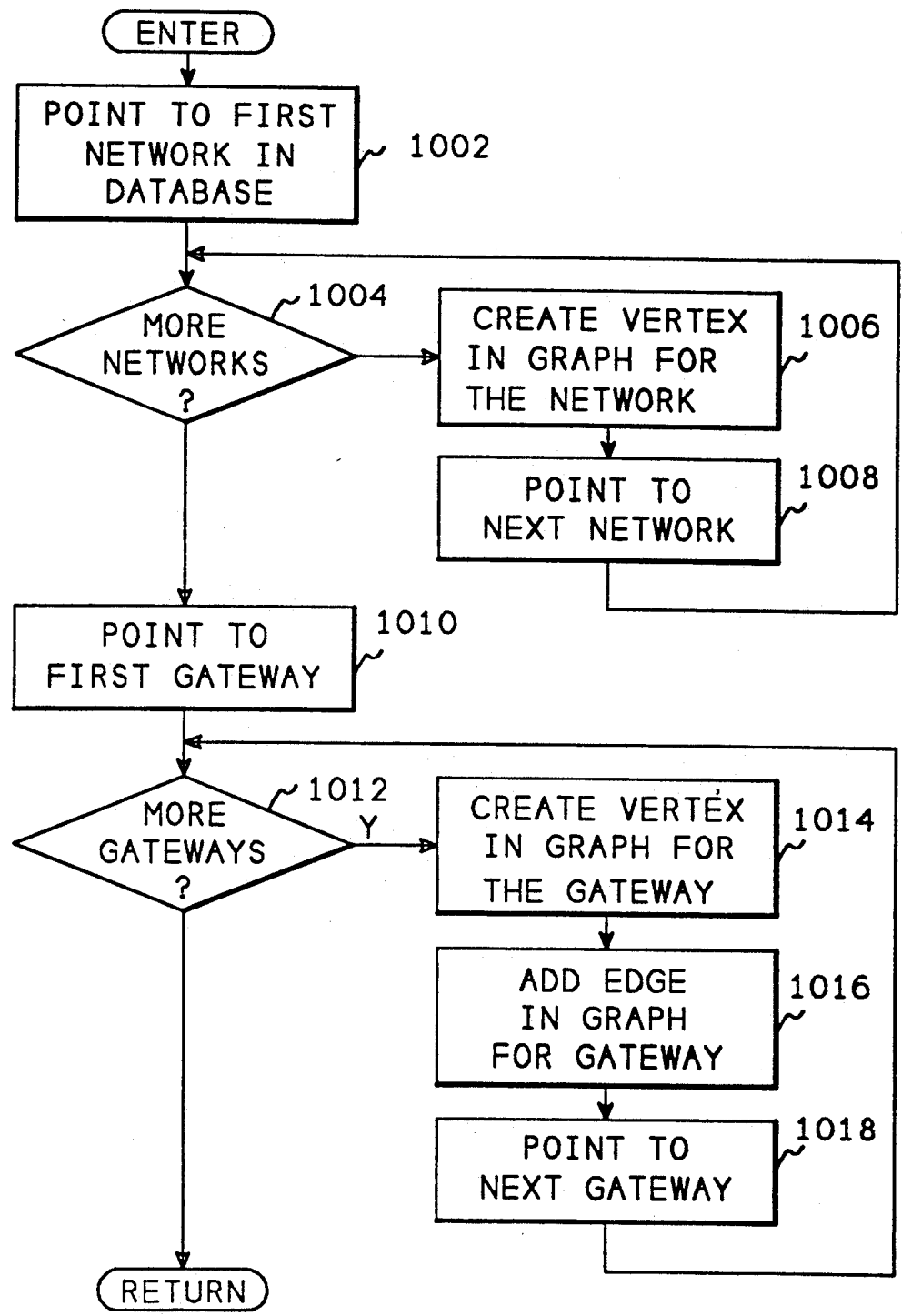
FIG. 10 is a flowchart of the construct internet graph module of the invention.

FIG. 10 shows a flowchart of the construct internet graph module 610 of FIG. 6. Referring now to FIG. 10, after entry, block 1002 establishes a pointer to the first network in the database. Block 1004 determines whether there are more networks within the internet, and if there are more networks, block 1004 transfers to block 1006. Block 1006 creates a vertex in the graph for the network, and block 1008 points to the next network and returns to block 1004. After all networks have been retrieved from the database, block 1004 transfers to block 1010 which points to the first gateway in the database. Block 1012 then determines whether there are more gateways, and if there are, transfers to block 1014 which creates a vertex in the graph for the gateway. Block 1016 then adds an edge to the graph for the gateway, and block 1018 points to the next gateway and returns to block 1012. After all gateways have been retrieved from the database, FIG. 10 returns to FIG. 9.

Figure 11:
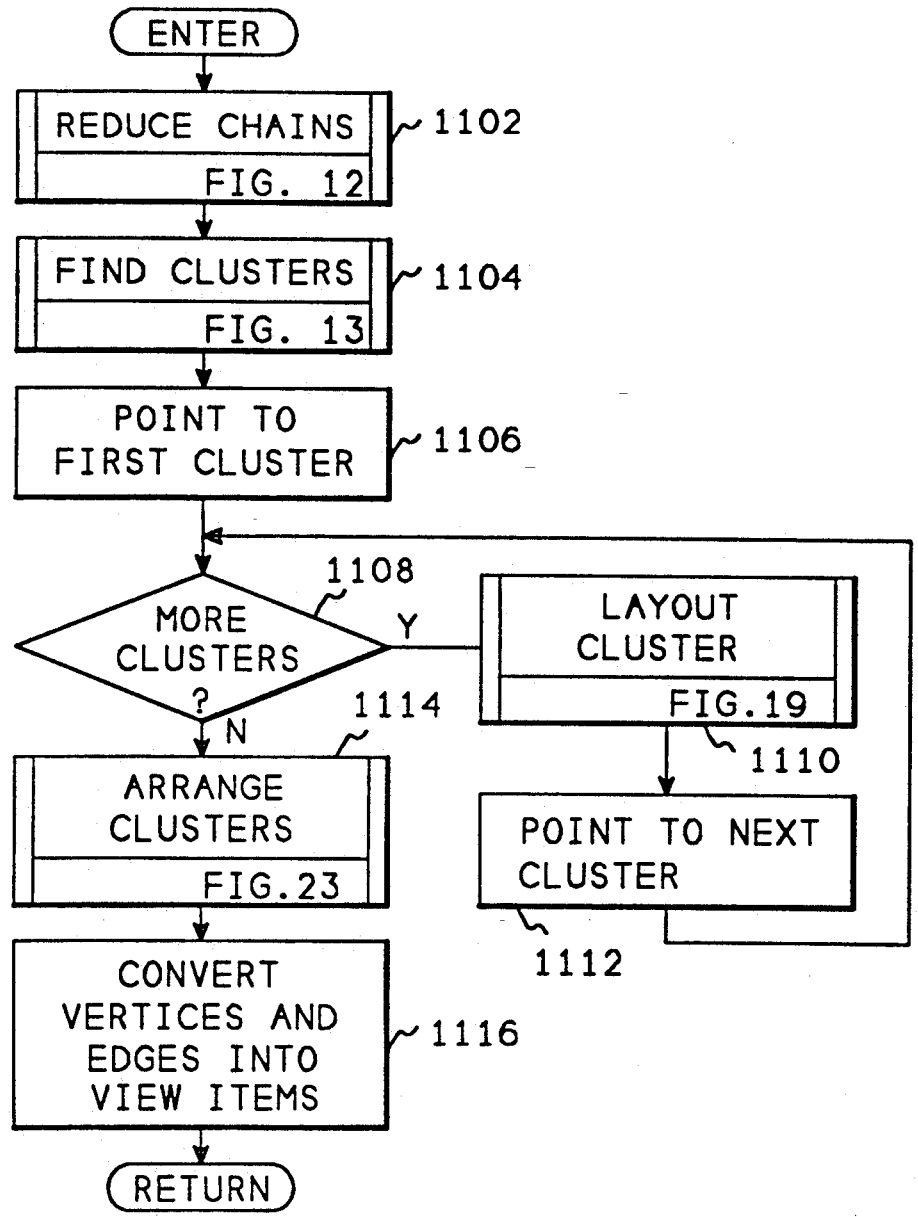
FIG. 11 is a flowchart of the layout topology module of the system.

FIG. 11 shows a flowchart of the layout topology module 702 of FIG. 7. Referring now to FIG. 11, after entry, block 1102 calls FIG. 12 to reduce the chains in the graph. As described earlier, a chain occurs when a vertex in the graph is connected to zero or one other vertices. If a vertex is only connected to one other vertex, it is temporarily deleted from the graph before the clusters are laid out. After returning from FIG. 12, block 1104 calls FIG. 13 to find all the clusters within the graph. Block 1106 then points to the first cluster found by FIG. 13, and block 1108 determines whether more clusters exist. If there are more clusters in the graph, block 1108 transfers to block 1110 which calls FIG. 19 to lay out the cluster. Block 1112 then points to the next cluster and control returns to block 1108 when all clusters have been laid out. After all clusters have been laid out, block 1108 transfers to block 1114 which then calls FIG. 23 to arrange the clusters on the graph. Block 1114 then converts all the vertices and edges into viewable objects, before returning to FIG. 9.

Figure 12:
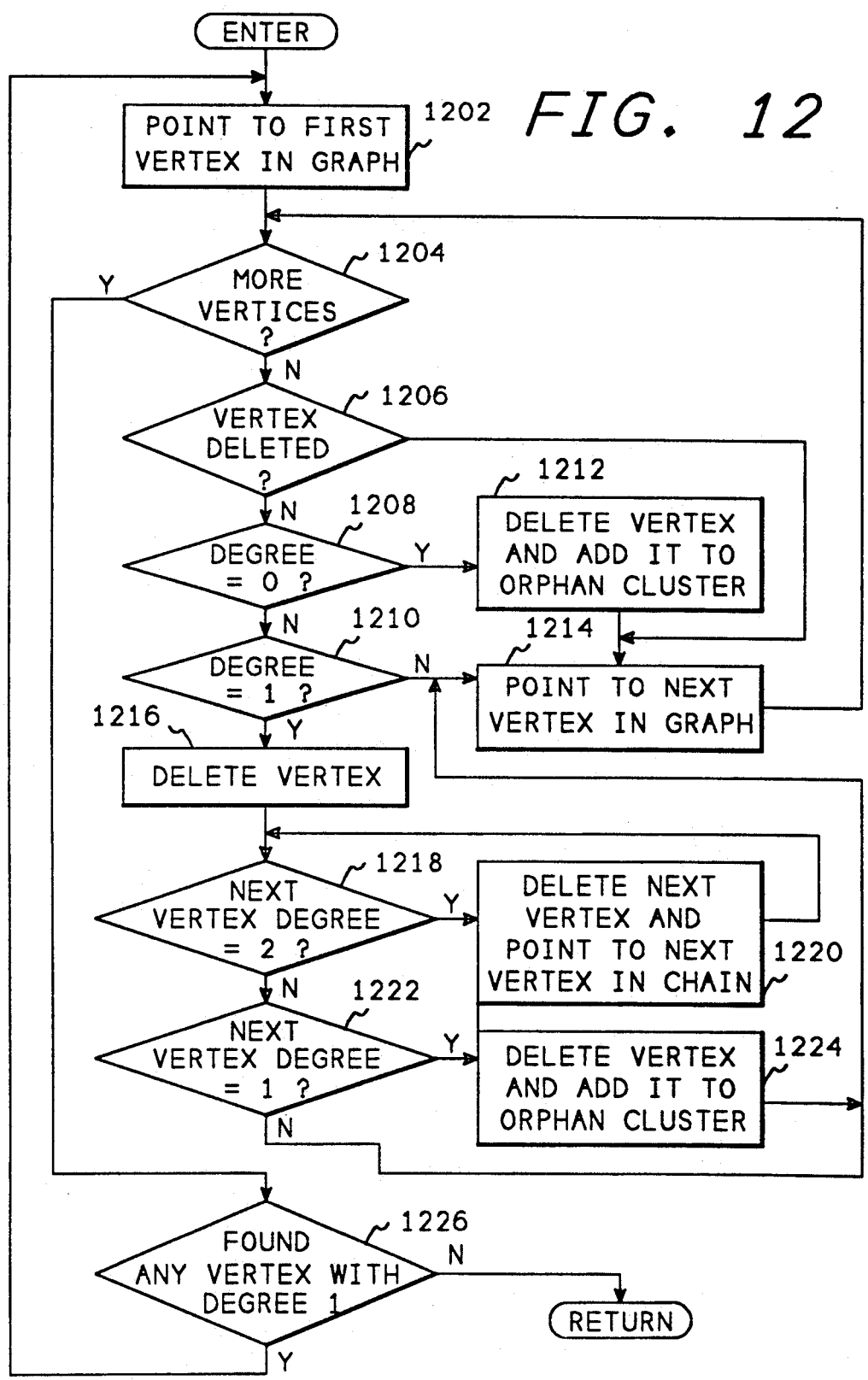
FIG. 12 is a flowchart of the reduce chains module of the system.

FIG. 12 shows a flowchart of the reduce chains module block 704 of FIG. 7. As discussed earlier, chains occur when a vertex is connected to only one other vertex, or is not connected to any other vertex. These chains are temporarily deleted from the graph, and reinserted after the rest of the vertices in the clusters of the graph have been laid out. Referring now to FIG. 12, after entry, block 1202 points to the first vertex in the graph. Block 1204 then determines whether the entire graph has been processed and if it has, control transfers to block 1226. If more vertices remain in the graph to be processed, block 1204 transfers to block 1206 which determines whether the vertex being pointed to has been deleted. If this vertex has already been deleted, control transfers to block 1214 which points to the next vertex and returns to block 1204 to continue the loop. If the vertex has not been deleted, block 1206 transfers to block 1208 which determines whether the vertex is of degree zero. If a vertex has degree zero, it has no connections to other vertices. If the degree of the vertex is zero, block 1208 transfers to block 1212 which deletes the vertex and adds it to another cluster called the orphan cluster. After adding the vertex to the orphan cluster, block 1212 transfer to block 1214 which points to the next vertex in the graph and continues the loop.

If the degree of the vertex is not zero, block 1208 transfers to block 1210 which determines whether the degree is one. If the degree of the vertex is not one, it must be greater than one, and is of no interest at this point in the process. Therefore, if the degree is not equal to one, block 1210 transfers to block 1214 which points to the next vertex in the graph and continues the loop. If the degree of the vertex is one, block 1210 transfers to block 1216 which deletes the vertex. Block 1218 then looks at the next vertex in the chain beyond the vertex currently pointed to. If the degree of the next vertex in the chain is two, it is another vertex in a continuous chain of vertices, therefore, block 1218 transfers to block 1220 which deletes the next vertex and points to the vertex beyond it in the chain before returning to block 1218. If the degree of the next vertex is not two, block 1218 transfers to block 1222 which determines whether the degree of the next vertex is one. If the degree of the next vertex is one, it is the other end of the chain, therefore, block 1222 transfers to block 1224 which deletes this vertex, adds it to the orphan cluster, and transfers to block 1214 to point to the next vertex in the graph. If the degree of the next vertex in the chain is not one or two, the end of the chain has been found, so control transfers to block 1214 to point to the next vertex in the graph.

When block 1204 determines that all vertices in the graph have been processed, control transfers to block 1226 which determines whether any vertex with degree one had been found. If any vertex with degree one had been found, the cluster was divided into multiple clusters. Therefore, block 1226 transfers back to block 1202 to reprocess the new clusters. After all clusters have been processed to remove all vertices with degree one or zero, FIG. 12 returns to FIG. 11.

Figure 13:
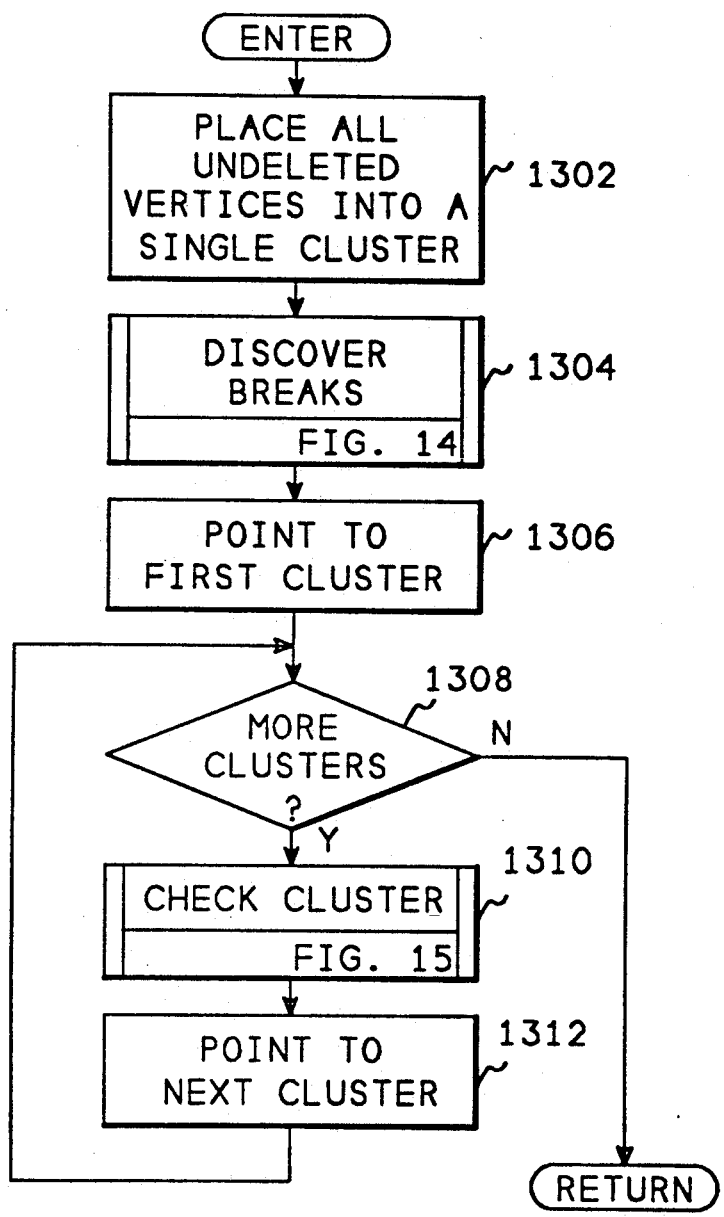
FIG. 13 is a flowchart of the find clusters module of the system.

FIG. 13 shows a flowchart of the find clusters module block 706 of FIG. 7. This module will find all of the clusters currently in the graph, and will divide any clusters which have only a single connection to another cluster. Referring now to FIG. 13, after entry, block 1302 places all vertices that have not been deleted into a single cluster. Block 1304 then calls FIG. 14 to discover any breaks that currently exist in the clusters. A break will exist where two clusters have no connection between them, for example, as illustrated by cluster 208 and the other clusters of FIG. 2. After all the breaks that naturally exist between the clusters have been discovered, block 1306 points to the first cluster that remains, if any, and block 1308 determines if there are more clusters to process. If there are more clusters to process, block 1308 transfers to block 1310 which calls the check cluster module of FIG. 15 to determine whether clusters can be separated by deleting an edge. After returning from FIG. 15, block 1314 points to the next cluster and returns to block 1308. After all clusters have been checked, FIG. 13 returns to FIG. 11.

Figure 14:
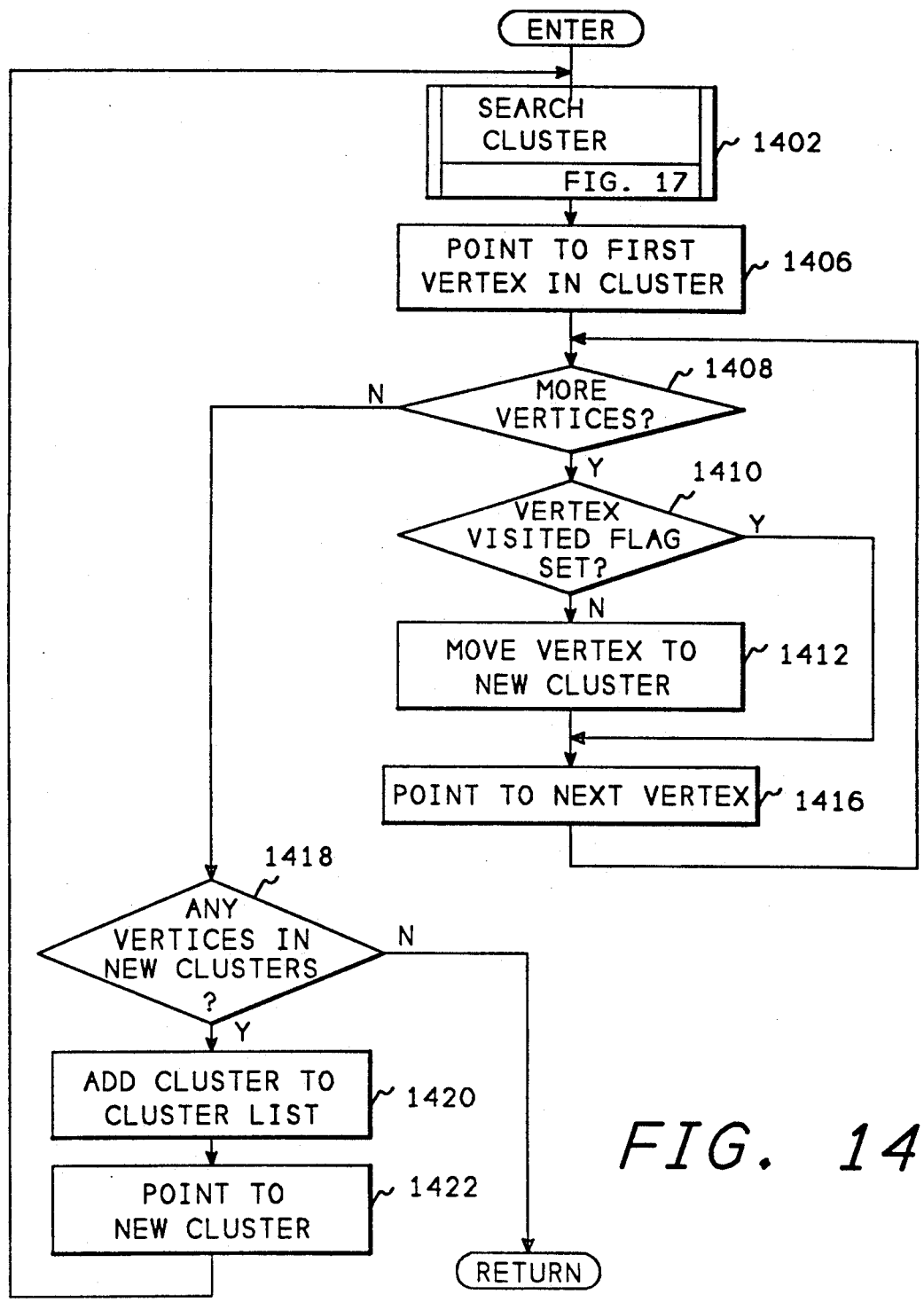
FIG. 14 is a flowchart of the discover breaks module of the system.
Figure 17:
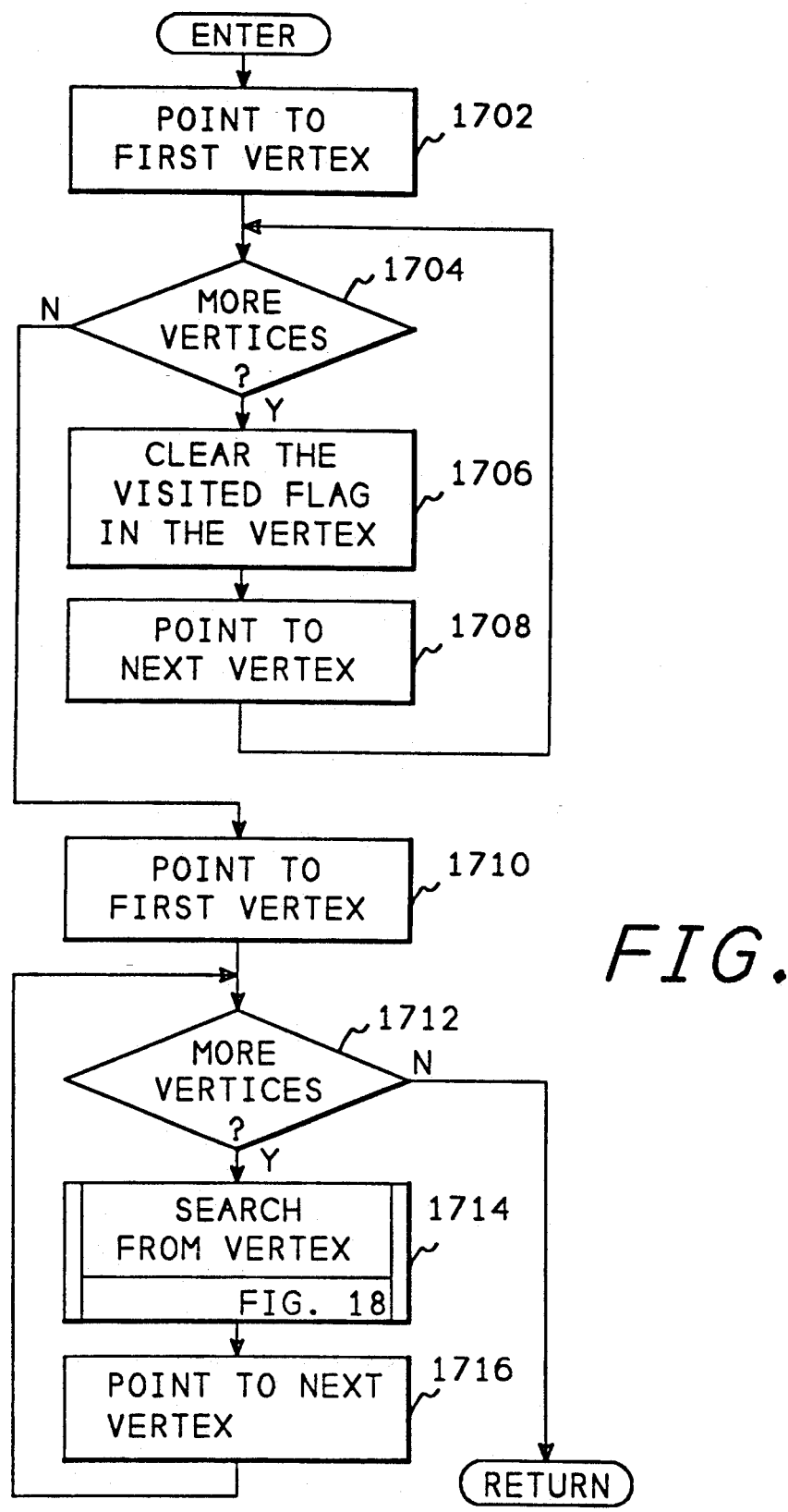
FIG. 17 is a flowchart of the search cluster module of the system.

FIG. 14 shows a flowchart of the discover breaks module block 712 of FIG. 7. Referring now to FIG. 14, after entry, block 1402 calls FIG. 17 which examines each vertex within the cluster and clears the flag that determines whether the vertex has been visited by this routine. FIG. 17 then follows all of the connections between the vertices to set the visited flag in all vertices that can be reached through these connections. If any vertices remain in the cluster that do not have their visited flag set after FIG. 17 has completed its processing, these vertices do not have a connection to the other vertices in the cluster. Block 1406 then points to the first vertex in the cluster and block 1408 determines if there are more vertices in the cluster. If there are more vertices in the cluster, block 1410 checks to see if the visited flag in this vertex has been set. If the visited flag has been set, block 1410 transfers to block 1416 to bypass this vertex. If the visited flag has not been set in the vertex, block 1410 transfers to block 1412 which moves this vertex to a new cluster. After moving the vertex to a new cluster, or if the vertex is being skipped, control goes to block 1416 which points to the next vertex in the cluster before returning to block 1408. After all vertices has been checked, block 1408 transfers to block 1418 to determine whether the new cluster contains any vertices. If the new cluster does not contain any vertices, no breaks were discovered and control returns to FIG. 13. If the new cluster does contain vertices, block 1418 transfers to block 1420 which adds this cluster to the list of clusters. Block 1422 then points to the new cluster and transfers to block 1402 to discover any breaks within this new cluster.

Figure 15:
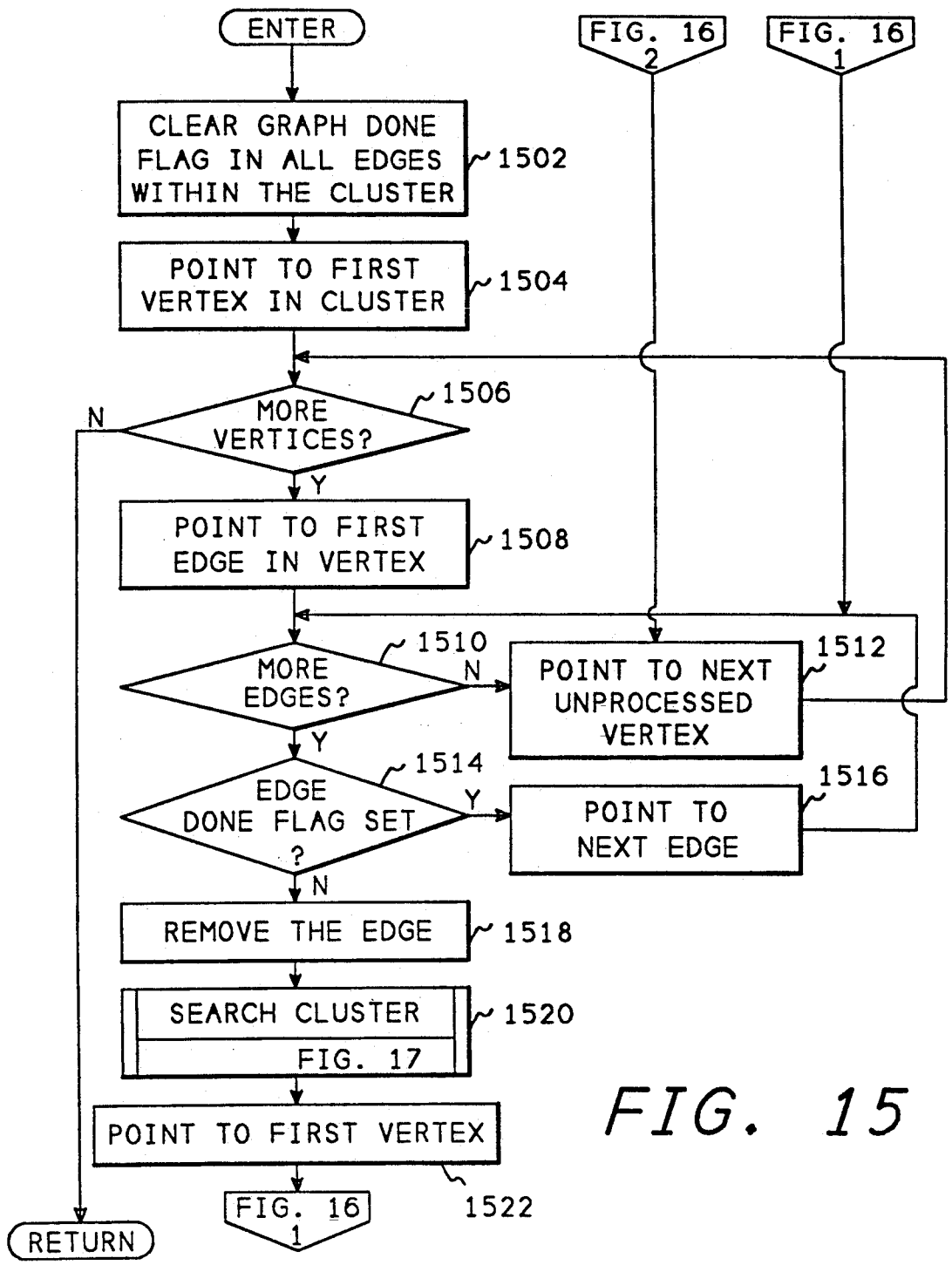
FIGS. 15 and 16 are a flowchart of the check cluster module of the system.
Figure 16:
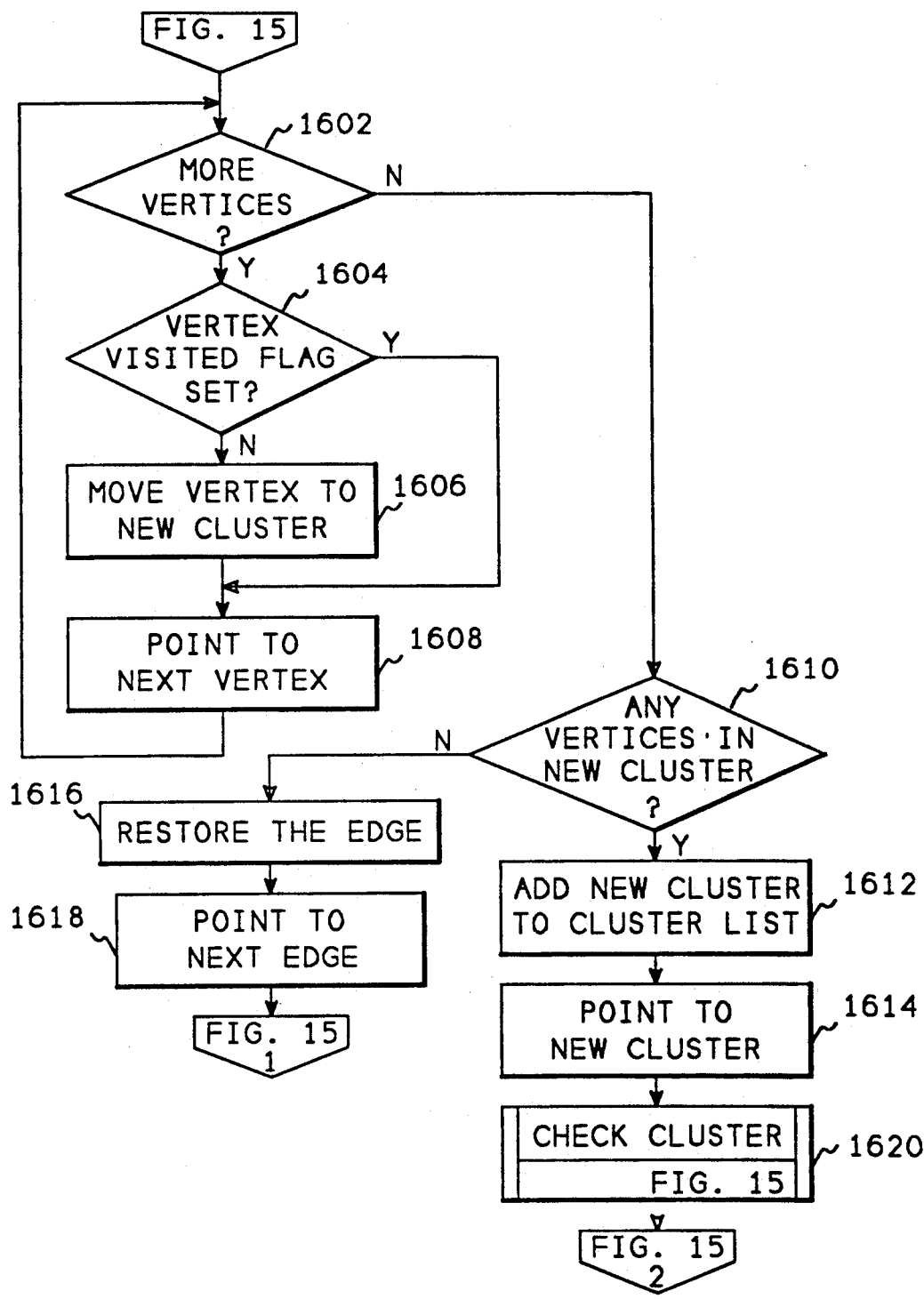

FIGS. 15 and 16 show a flowchart for the process of checking a cluster to determine whether it can be subdivided into further clusters. The process involves temporarily deleting each connection within the cluster, and then tracing all other connections to determine whether all vertices can still be reached through some connection. If one or more vertices cannot be reached after temporarily deleting the connection, the vertices that cannot be reached are separated and made into a second cluster. Referring now to FIGS. 15 and 16, after entry, block 1502 examines each edge (connection) within the cluster and clears a graph done flag contained within the data structure for the edge. Block 1504 then points to the first vertex within the cluster. Block 1506 determines if more vertices need to be examined, and if not, block 1506 returns to FIG. 13. If more vertices are to be examined, block 1506 transfers to block 1508 which sets a pointer to point to the first edge within the vertex. Block 1510 then determines if there are more edges within this vertex to be examined. If there are no more edges within this vertex, block 1510 transfers to block 1512 which points to the next unprocessed vertex within the cluster and returns to block 1506. If there are more edges to be examined, block 1510 transfers to block 1514 which checks to see if this edge has its done flag set. As described earlier, the done flag for each edge is initially cleared, so if this edge has its done flag set, it has already been examined. If the done flag is set, block 1514 transfers to block 1516 which points to the next edge within the vertex, and returns to block 1510. If the done flag is not set for this edge, block 1514 transfers to block 1518 which temporarily removes the edge from the graph. Block 1520 then calls FIG. 17 to search the cluster to determine if removing this edge causes a break in the cluster. The process of FIG. 17 will initially clear the visited flag in all vertices, and then set the visited flag for all vertices that can be visited through remaining connections. After returning from FIG. 17, block 1522 points to the first vertex in the cluster and transfers to FIG. 16. Block 1602 then determines if there are more vertices to be examined within the cluster, and if there are, transfers to block 1604 which determines whether the visited flag is set within this vertex. If the visited flag is not set, this vertex cannot be reached through the remaining connections, and block 1606 removes the vertex and places it in a new cluster. After moving the vertex or if the visited flag was set, control goes to block 1608 which points to the next vertex and returns to block 1602.

After all the vertices within the cluster have been examined, block 1602 transfers to block 1610 to determine if any vertices were placed in the new cluster. If no vertices were placed in the new cluster, removing this edge temporarily was unsuccessful in establishing a break in the clusters. Therefore, if no vertices were placed in a new cluster, block 1610 transfers to block 1616 which restores the edge which had been deleted in block 1518. Control then goes to block 1618 which points to the next edge within the vertex and control returns to FIG. 15, block 1510. If any new vertices had been placed in the new cluster, block 1610 transfers to block 1612 which adds this new cluster to the list of clusters, and block 1614 points to the new cluster. Block 1620 then recursively calls FIG. 15 to examine the new cluster. Control then returns to FIG. 15, block 1512 to process the next vertex.

FIG. 17 is a flowchart of the search cluster module block 720 of FIG. 7. This module, and the search from vertex module of FIG. 18 which is called by this module, determine whether all vertices in the cluster can be reached by following the connections between the vertices. Referring now to FIG. 17, after entry, block 1702 points to the first vertex in the cluster. Block 1704 then determines if there are more vertices to be examined, and if there are, block 1704 transfers to block 1706 which clears the visited flag in the data structure of the vertex. Block 1708 then points to the next vertex in the cluster and control returns to block 1704. After all the visited flags for all the vertices within the cluster have been cleared, block 1704 transfers to block 1710 which again points to the first vertex in the cluster. Block 1712 then determines whether there are more vertices to be examined within the cluster and if there are, transfers control to block 1714. Block 1714 calls FIG. 18 to search from this vertex to determine whether all other vertices can be reached in the cluster. After returning from FIG. 18, block 1716 points to the next vertex and returns control to block 1712. This loop continues until all vertices have been examined, and then FIG. 17 returns to FIG. 15.

Figure 18:
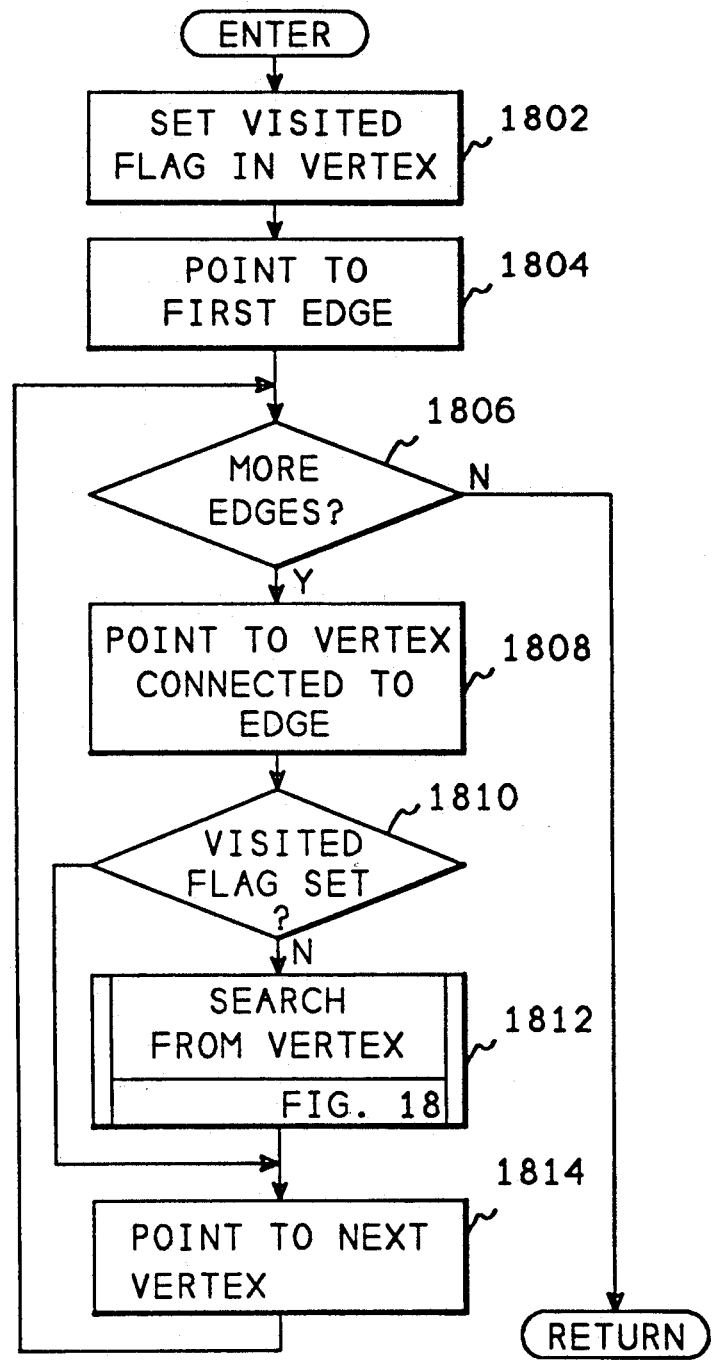
FIG. 18 is a flowchart of the search from vertex module of the system.

FIG. 18 is a flowchart of the search from vertex module, block 1722 of FIG. 7. Referring now to FIG. 18, after entry, block 1802 sets the visited flag in the vertex passed from FIG. 17. Block 1804 then points to the first edge within this vertex and block 1806 determines if there are more edges to be examined. If there are more edges to be examined, block 1808 points to the vertex connected by the edge. Block 1810 then determines whether the visited flag has been set in the connected vertex. If the visited flag has been set, then this vertex has been visited from some other connection, and control returns to block 1806. If the visited flag has not been set, block 1810 transfers to block 1812 which recursively calls this same FIG. 18 to search from the connected vertex. If the visited flag was set, or after searching from the connected vertex, control goes to block 1814 which points to the next edge within the original vertex and then returns to block 1806. After all edges for this vertex have been examined, FIG. 18 returns to FIG. 17.

Figure 19:
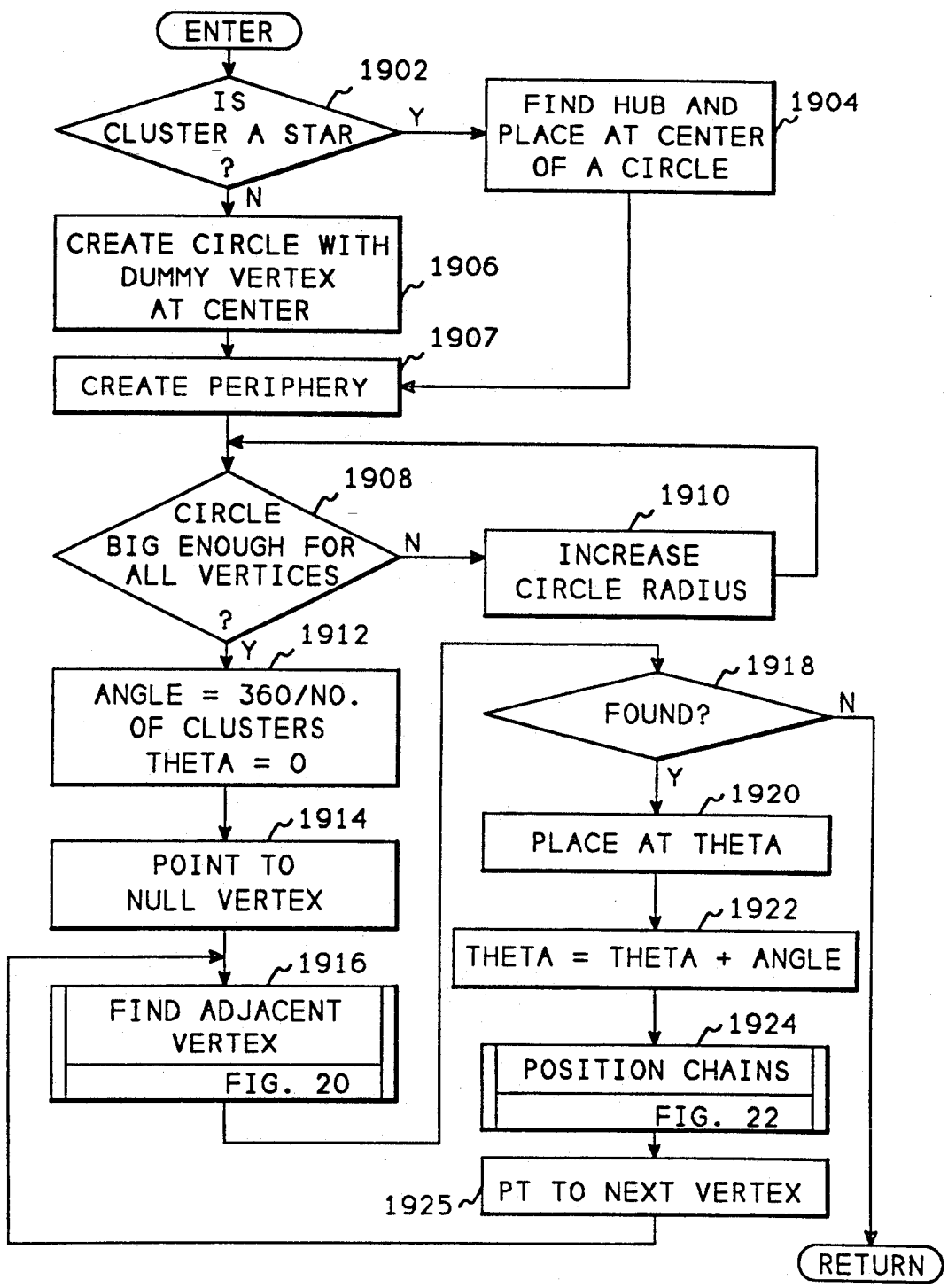
FIG. 19 is a flowchart of the layout cluster module of the system.

FIG. 19 shows a flowchart of the layout cluster module block 708 of FIG. 7. This module will lay out the vertices of the cluster onto the graph. Referring now to FIG. 19, after entry, block 1902 determines whether the cluster is a star. An example of a star cluster is cluster 206 in FIG. 2. If the cluster is a star, block 1902 transfers to block 1904 which places the hub of the star at the center of a circle and then transfers to block 1907. If the cluster is not a star, block 1902 transfers to block 1906 which creates a circle having a dummy vertex at its center before transferring to block 1907.

Block 1907 finds all vertices having exactly two edges, and creates a periphery for these clusters. When a cluster has exactly two edges, it can be placed outside the circle to conserve space on the circumference of the circle. Therefore, the clusters on either side of the cluster having two edges are marked for placement to the left and right of each other, and the cluster having two edges will be placed outside these two clusters. After creating a periphery of all these clusters, control goes to block 1908.

Figure 22:
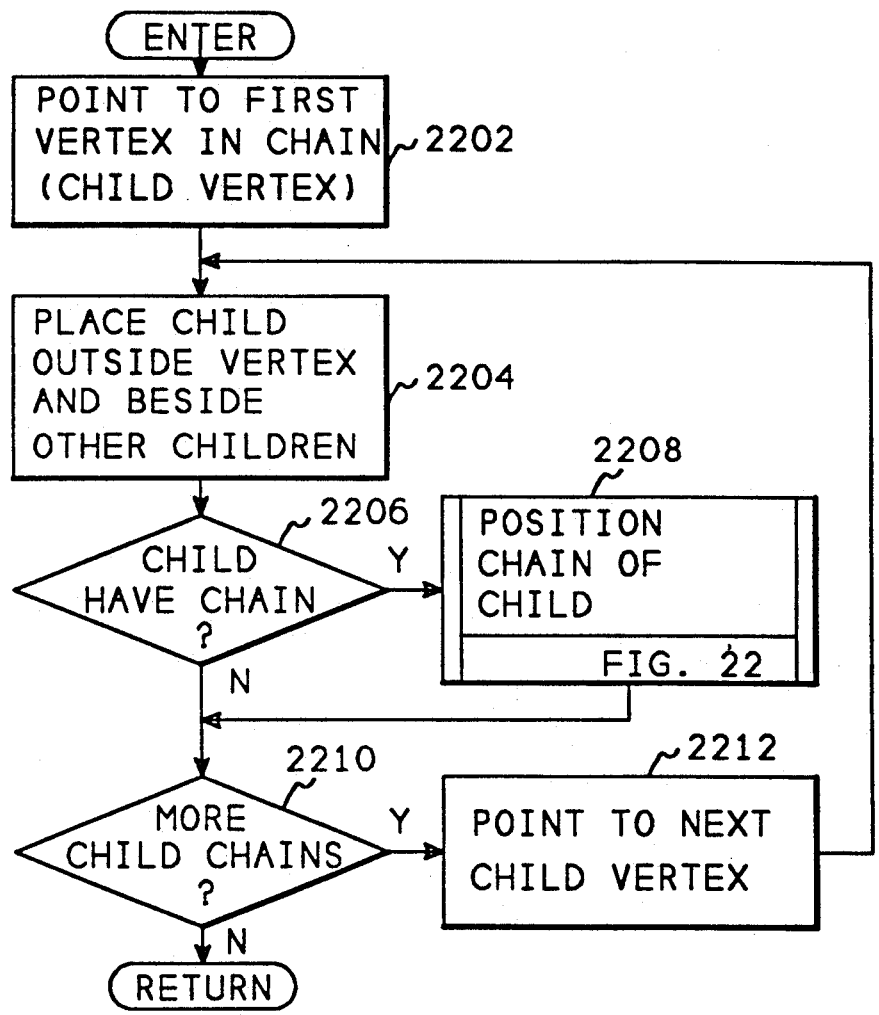
FIG. 22 is a flowchart of the position chains module of the system.

Block 1908 determines whether the circle is large enough to place all the vertices in the cluster, and if not, control goes to block 1910 which increases the radius of the circle to allow for the number of vertices. If the circle is large enough, block 1908 transfers to block 1912 which sets a variable, called angle, to the number of degrees of the circle between the graphic objects that represent the vertices of the cluster. Block 1912 also sets another variable, theta, to zero. The theta variable is the angle used to place the next vertex on the circumference of the circle. Block 1914 then points to a null vertex in preparation for placing the first vertex on the circumference of the circle. Block 1916 then calls FIG. 20 to find an adjacent vertex. Block 1918 determines if an adjacent vertex was found and if it was, block 1920 places the graphic object for this vertex on the circumference of the circle at the angle defined by theta. Block 1922 then increments the variable theta by the variable angle to point to the location for the next graphic object on the circle. Block 1924 then calls FIG. 22 to position any chains that are attached to this vertex outside the circumference of the circle. These chains had been deleted from the graph by the reduce chains module of FIG. 12. FIG. 22 reinserts the chains and locates them outside the circumference of the circle adjacent to the graphic object for the vertex. Block 1926 then points to the next vertex in the cluster, and control returns to block 1916. After all vertices have been placed, FIG. 20 will no longer find an adjacent vertex, and block 1918 will return to FIG. 11.

Figure 20:
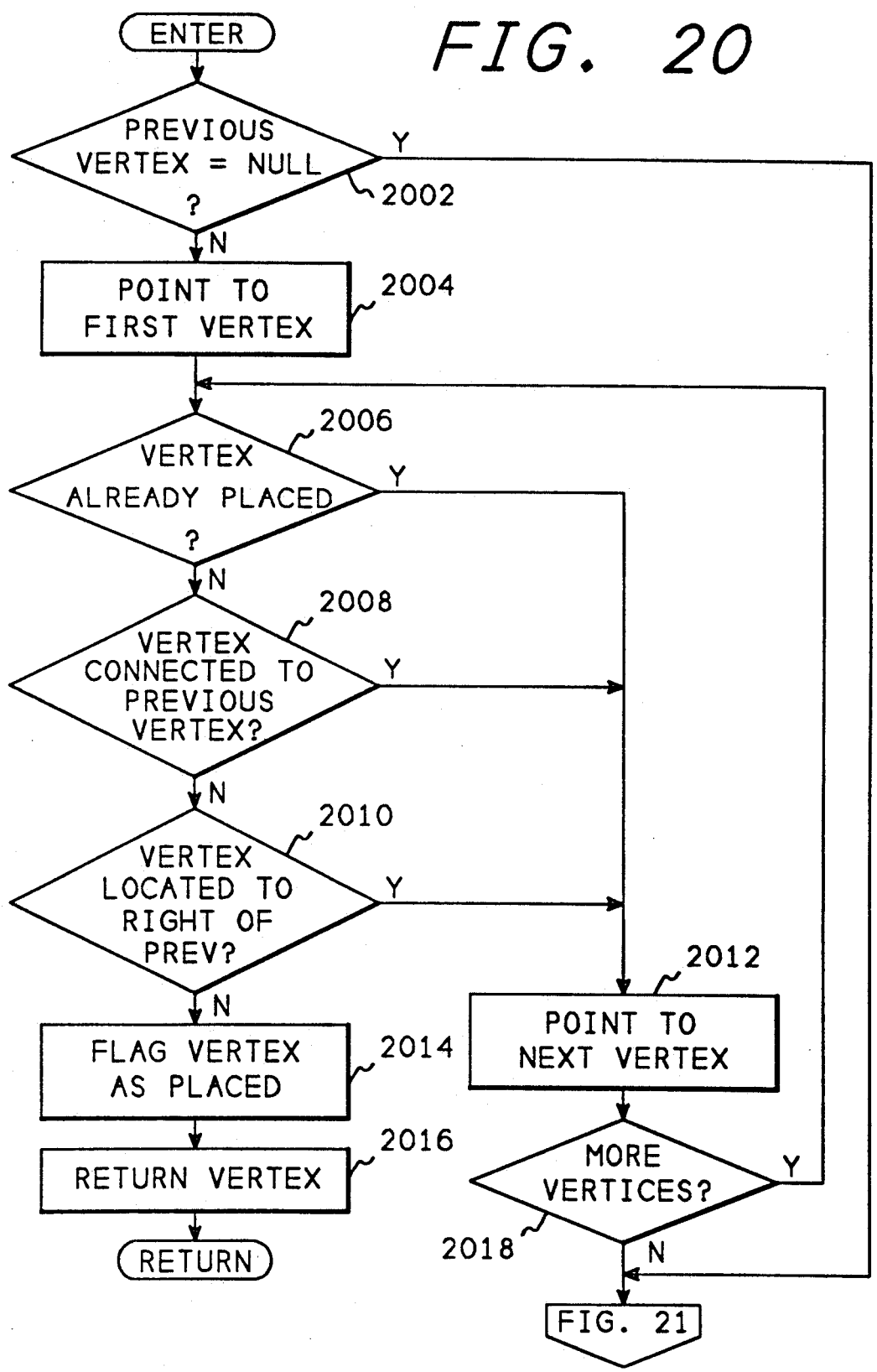
FIGS. 20 and 21 are a flowchart of the find adjacent vertex module of the system.
Figure 21:
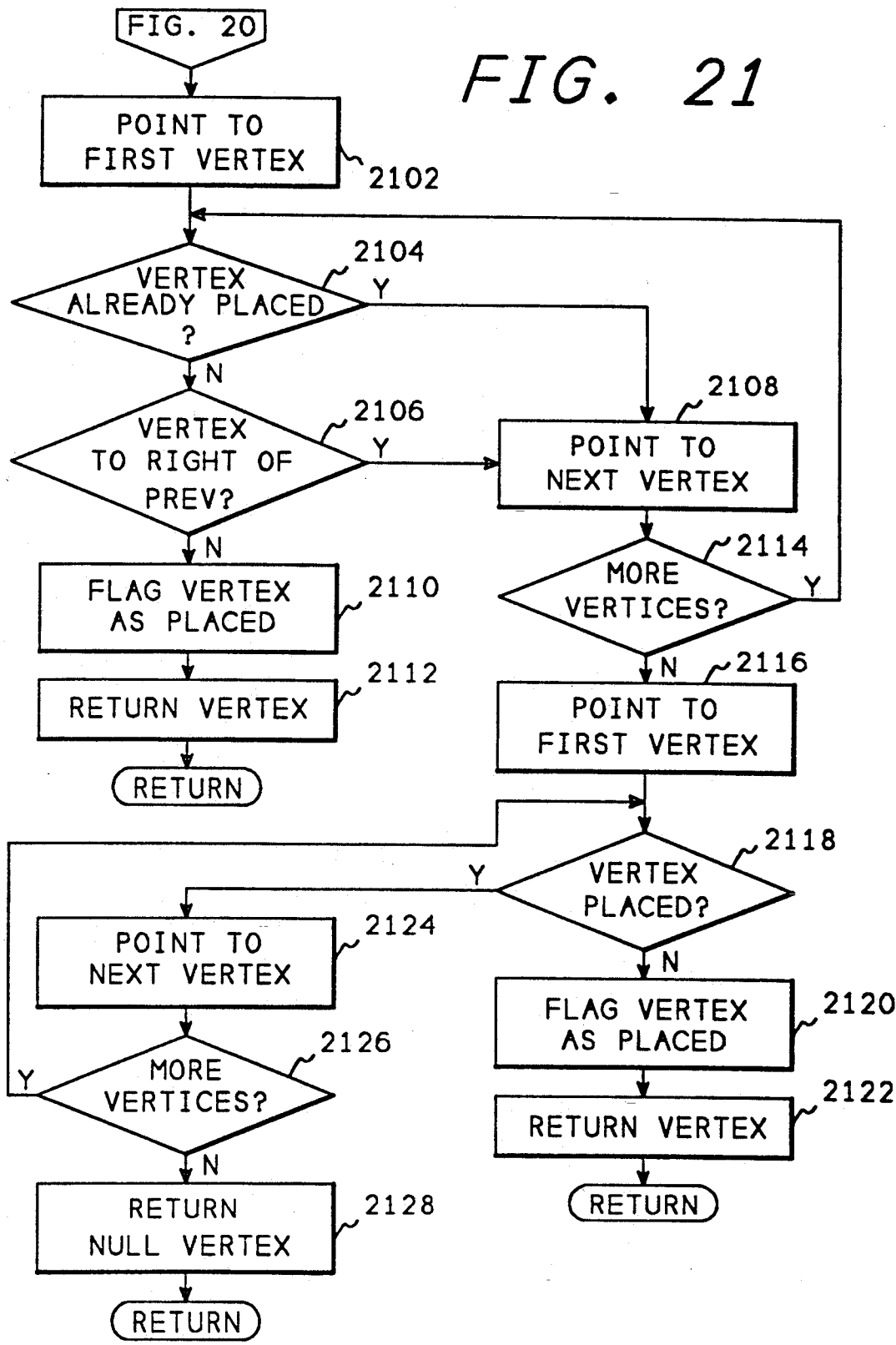

FIGS. 20 and 21 show a flowchart of the find adjacent vertex module block 716 of FIG. 7. The find adjacent vertex module will attempt to find a vertex which is connected to the previous vertex, which was passed from FIG. 19. Referring now to FIGS. 20 and 21, after entry, block 2002 determines if the previous vertex passed from FIG. 19 is a null vertex. If the previous vertex is null, control transfers to block 2102 of FIG. 21. If the previous vertex is not null, control goes to block 2004 which points to the first vertex in the cluster. Block 2206 then determines if this vertex is already placed. If the vertex is not already placed, control goes to block 2008 which determines whether the vertex is connected to the previous vertex. If the vertex is connected to the previous vertex (through at least one edge), control goes to block 2010 which determines whether the vertex is located to the right of the previous vertex. A cluster will be to the right of another cluster if it was involved in a placement of a periphery in block 1907. If the vertex is not located to the right of the previous vertex, control goes to block 2014 which flags this vertex as placed, and returns the vertex to FIG. 19 for placement. If the vertex had already been placed, or if the vertex is not connected to the previous vertex, or if the vertex is located to the right of the previous vertex, control goes to block 2012 which points to the next vertex in the cluster. Block 2018 then determines if there are more vertices to be examined and if there are, control returns to block 2006 to examine the next vertex. If no more vertices are to be examined, control goes to block 2102 of FIG. 21.

At this point, the process has determined that there are no vertices that have not been placed, and connected to the previous vertex, and are not located to the right of the previous vertex. Block 2102 again points to the first vertex in the cluster. Block 2104 determines if this vertex has already been placed and if not, control goes to block 2106. Block 2106 determines if the vertex is to the right of the previous vertex. If the vertex is not to the right of the previous vertex, control goes to block 2110 which flags this vertex as placed, before block 2112 returns the vertex to FIG. 19. If the vertex had already been placed, or if it is to the right of the previous vertex, control goes to block 2108 which points to the next vertex. Block 2114 then determines if more vertices remain to be examined and if so, control returns to block 2104 to examine the next vertex. If there are no more vertices to be examined, control goes to block 2116.

At this point, the process has determined that there are no unplaced vertices to the left of the previous vertex. Block 2116 again points to the first vertex in the cluster. Block 2118 determines whether this vertex has been placed and if the vertex has been placed, block 2118 transfers to block 2124 which points to the next vertex in the cluster. Block 2126 then determines if there are more vertices to be examined, and if there are, control returns to block 2118 to examine the next vertex. If there are no more vertices to be examined, block 2126 transfers to block 2128 which returns the null vertex to FIG. 19, indicating that there are no more vertices to be placed in the cluster. If the vertex had not been placed, block 2118 transfers to block 2120 which flags the vertex as placed before block 2122 returns the vertex to FIG. 19.

FIG. 22 shows a flowchart of the position chains module block 718 of FIG. 7. This module will place the chains connected to the vertex passed from FIG. 19 outside the circumference of the circle. Referring now to FIG. 22, after entry, block 2202 points to the first vertex connected to the vertex passed from FIG. 19, called the child vertex. Block 2204 then places the child vertex outside the parent vertex and beside any other children vertices that have already been placed. Block 2206 then determines whether the child vertex has children of its own. If the child vertex does have other child vertices connected to it, block 2206 transfers to block 2208 which recursively calls this same FIG. 22 to position chains connected to the child. If the child vertex did not have any children of its own, or after positioning those children, control goes to block 2210 which determines whether there are any more children vertex in the chain. If there are more children vertices connected to the parent vertex, control goes to block 2212 which points to the next child vertex before returning to block 2204 to place that vertex. If there are no more children to be placed, FIG. 22 returns to FIG. 19.

Figure 23:
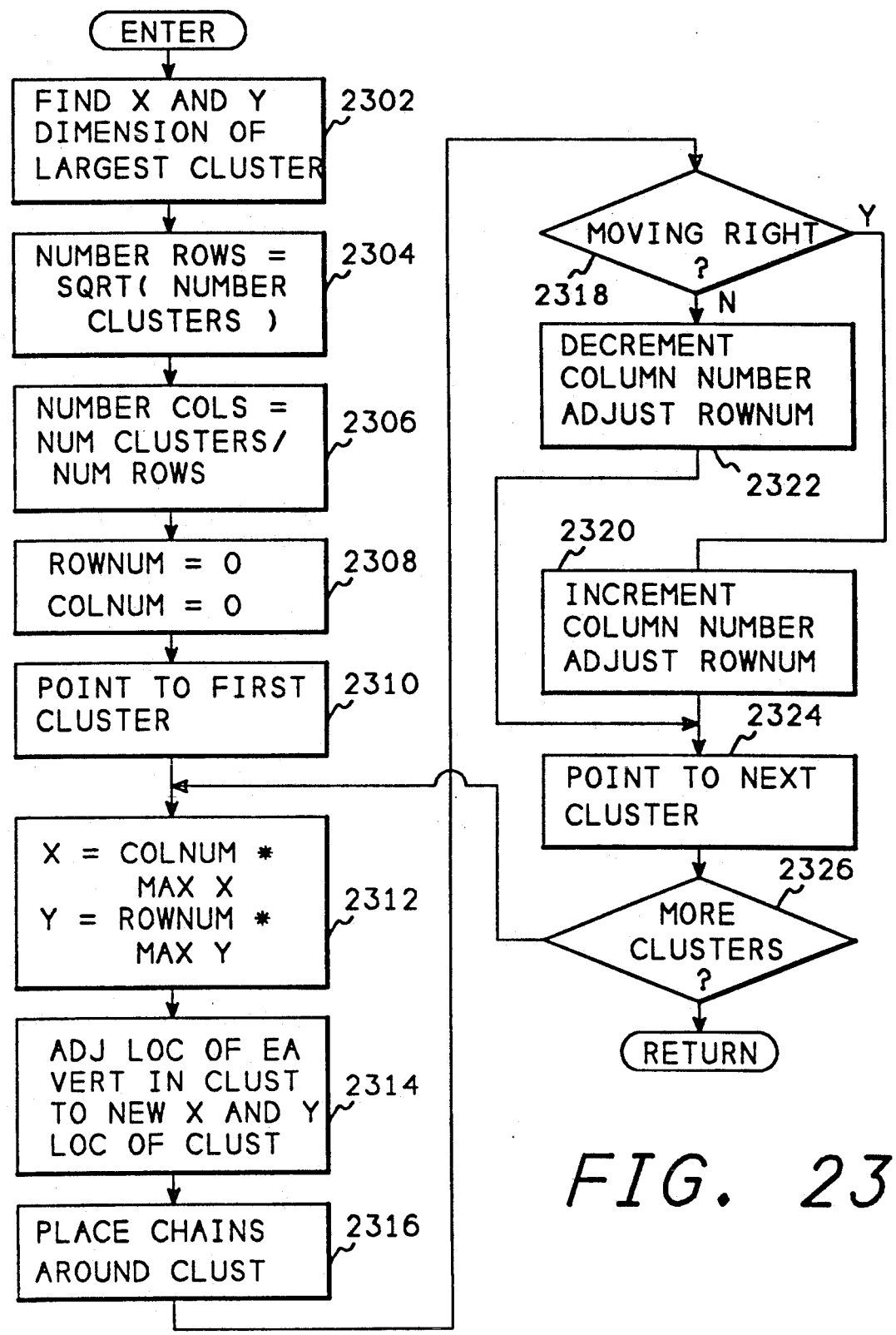
FIG. 23 is a flowchart of the arrange clusters module of the invention.

FIG. 23 shows a flowchart of the arrange clusters module block 710 of FIG. 7. After all the clusters of the network have been laid out individually, this module is called to arrange the clusters on the graph. Referring now to FIG. 23, after entry, block 2302 finds the X and Y dimension of the largest cluster to be arranged. Block 2304 then determines the number of rows on the graph, by taking the square root of the number clusters. Block 2306 then determines the number of columns by dividing the number of clusters by the number of rows. Block 2308 sets the row number to zero and the column number to zero and block 2310 points to the first cluster to be placed. Block 2312 sets the X coordinate for the placement equal to the column number times the maximum X dimension determined in block 2302, and sets the Y coordinate to the row number times the maximum Y dimension determined in block 2302. Block 2314 then adjusts the location of the each vertex in the cluster to the new X and Y locations of the cluster determined in block 2312. Block 2316 then adjusts the chain vertices that are around the cluster to the new X and Y locations. Block 2318 determines whether the layout is moving to the right, and if it is, transfers control to block 2320 which increments the column number. If the column number is greater than the maximum number of columns for this display, block 2320 also increments the row number and sets the column number to the last column. If the display locations are moving to the left, block 2218 transfers to block 2322 which decrements the column number. If the column number is less than zero, block 2322 also increments the row number and sets the column number to 1. In either case, control transfers to block 2324 which points to the next cluster to be placed. Block 2326 then determines if more clusters are to be placed, and if so, control transfers back block to 2312 to place the next cluster. If all clusters have been placed, block 2326 returns to FIG. 11.

Figure 24:
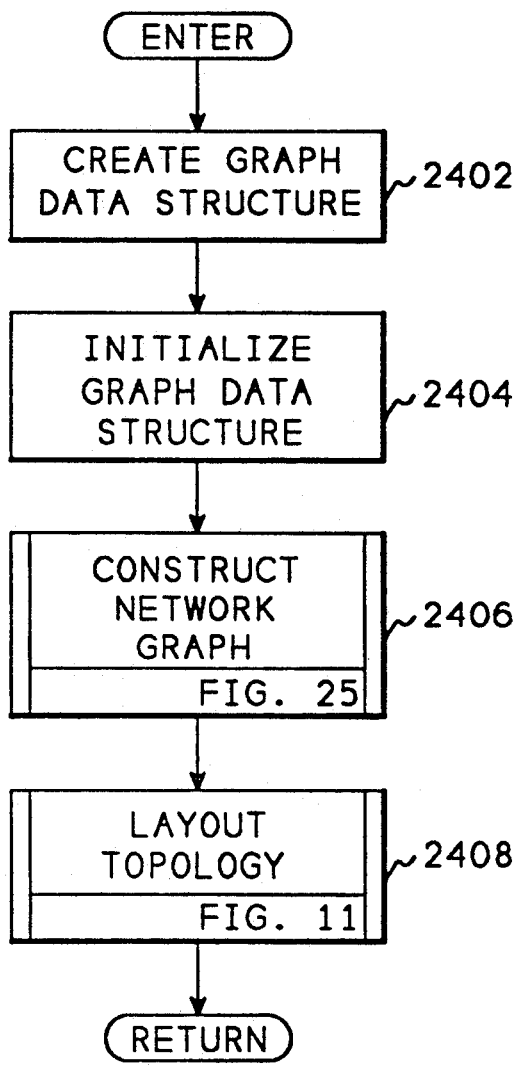
FIG. 24 is a flowchart of the network layout module of the system.

If the user requests a network layout in the user interface module (FIG. 8), FIG. 8 calls the network layout module FIG. 24. FIG. 24 shows a flowchart of the network layout module block 606 of FIG. 6. Referring now to FIG. 24, after entry, block 2402 creates a data structure for the network graph. Block 2404 then initializes the graph data structure, and block 2406 calls FIG. 25 to determine the network segments that should be included in the network graph. After returning from FIG. 25, block 2408 calls FIG. 11 to lay out the topology of the network graph before returning to FIG. 8.

Figure 25:
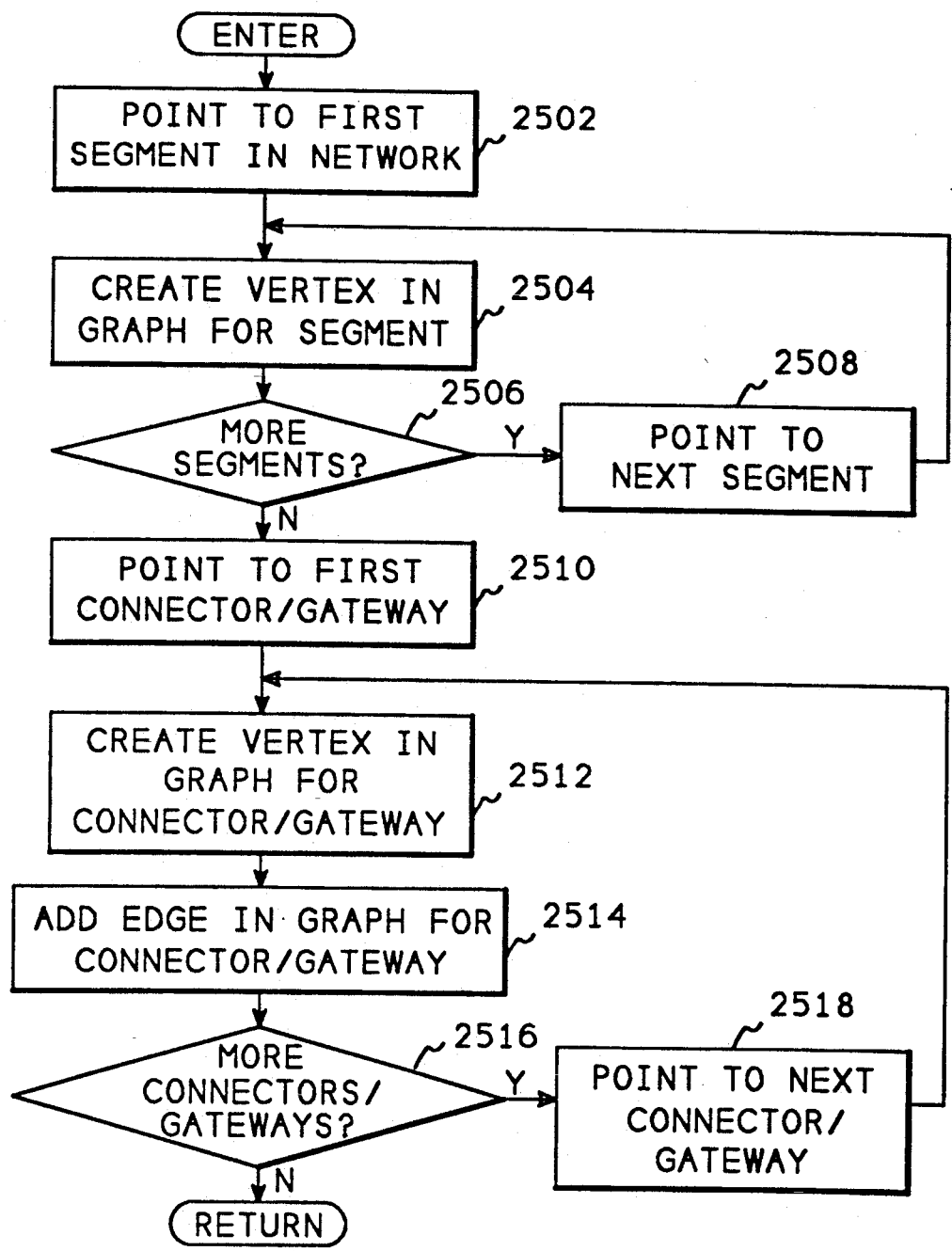
FIG. 25 is a flowchart of the construct network graph module of the system.

FIG. 25 shows a flowchart of the construct network graph module block 612 of FIG. 6. Referring now to FIG. 25, block 2502 points to the first segment of the database that is within the network. Block 2504 then creates a vertex in the graph data structure for this segment. Block 2506 determines if there are more segments within the database for this network, and if so, transfers to block 2508 to point to the next segment within the this network before returning control to block 2504. If there are no more segments within this network, block 2506 transfers to block 2510 which points to the first connector or gateway within the network. Block 2512 then creates a vertex in the graph data structure for the connector or gateway, and block 2514 adds an edge in the graph for the connector or gateway. Block 2516 then determines if there are more connectors or gateways for this network, and if so, transfers to block 2518 which points to the next connector or gateway before returning control to block 2512. If there are no more connectors or gateways for this network, block 2516 returns to FIG. 24.

Figure 26:
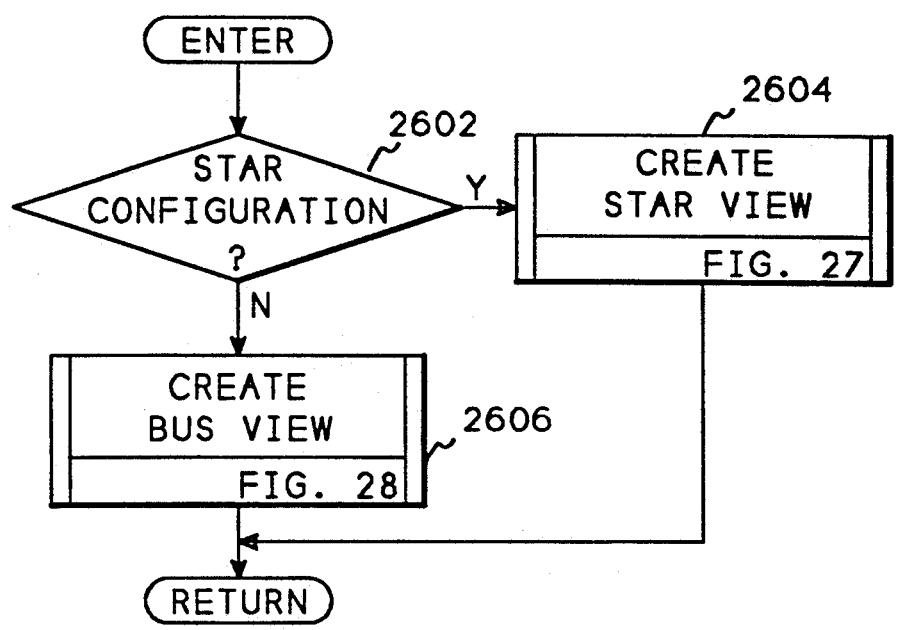
FIG. 26 is a flowchart of the create segment view module of the system.

If the user requests a segment layout, FIG. 8 transfers to FIG. 26 to create a segment view. FIG. 26 shows a flowchart of the create segment view module block 608 of FIG. 6. Referring now to FIG. 26, after entry, block 2602 determines whether the segment to be displayed has a star configuration. If the segment has a star configuration, block 2602 transfers to block 2604 which calls FIG. 27 to create a star view. If the network does not have a star configuration, block 2602 transfers to block 2606 which calls FIG. 28 to create a bus view of the segment. After creating either the star view or the bus view, FIG. 26 returns to FIG. 8.

Figure 27:
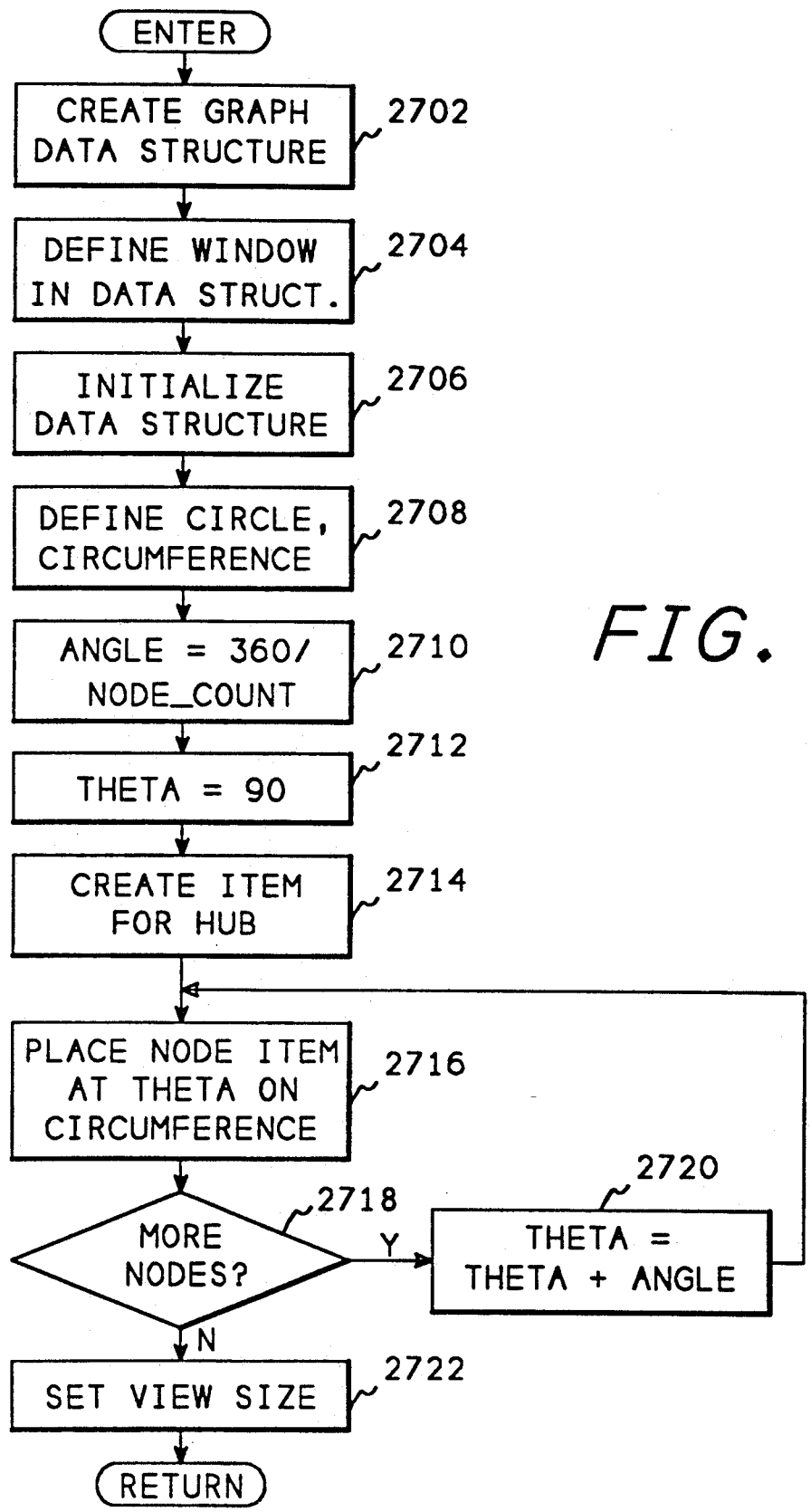
FIG. 27 is a flowchart of the layout star view module of the system.

FIG. 27 shows a flowchart of the layout star view module block 614 of FIG. 6. Referring now to FIG. 27, after entry, block 2702 creates a graph data structure for the star view. Block 2704 then defines a window within the data structure to display the graph, and block 2706 initializes the data structure. Block 2708 then defines a circle with a circumference large enough to contain all the graphical objects to be displayed for the vertices of the graph. Block 2710 then defines a variable, angle, to be 360 divided by the number of nodes within the segment. Block 2712 then sets a second variable, theta, to a value of 90. Block 2714 then creates a display object for the hub of the star. Block 2716 places a node of the segment at the location defined by the variable theta, on the circumference of the circle. Block 2718 then determines if there are more nodes to be placed, and if so, control goes to block to 2720 which increments theta by angle to determine the location for placing the next node. Block 2720 then returns to block 2716 to place the next node. After all nodes have been placed, block 2718 transfers control to block 2722 which sets the view size for the star view before returning control to FIG. 26.

Figure 28:
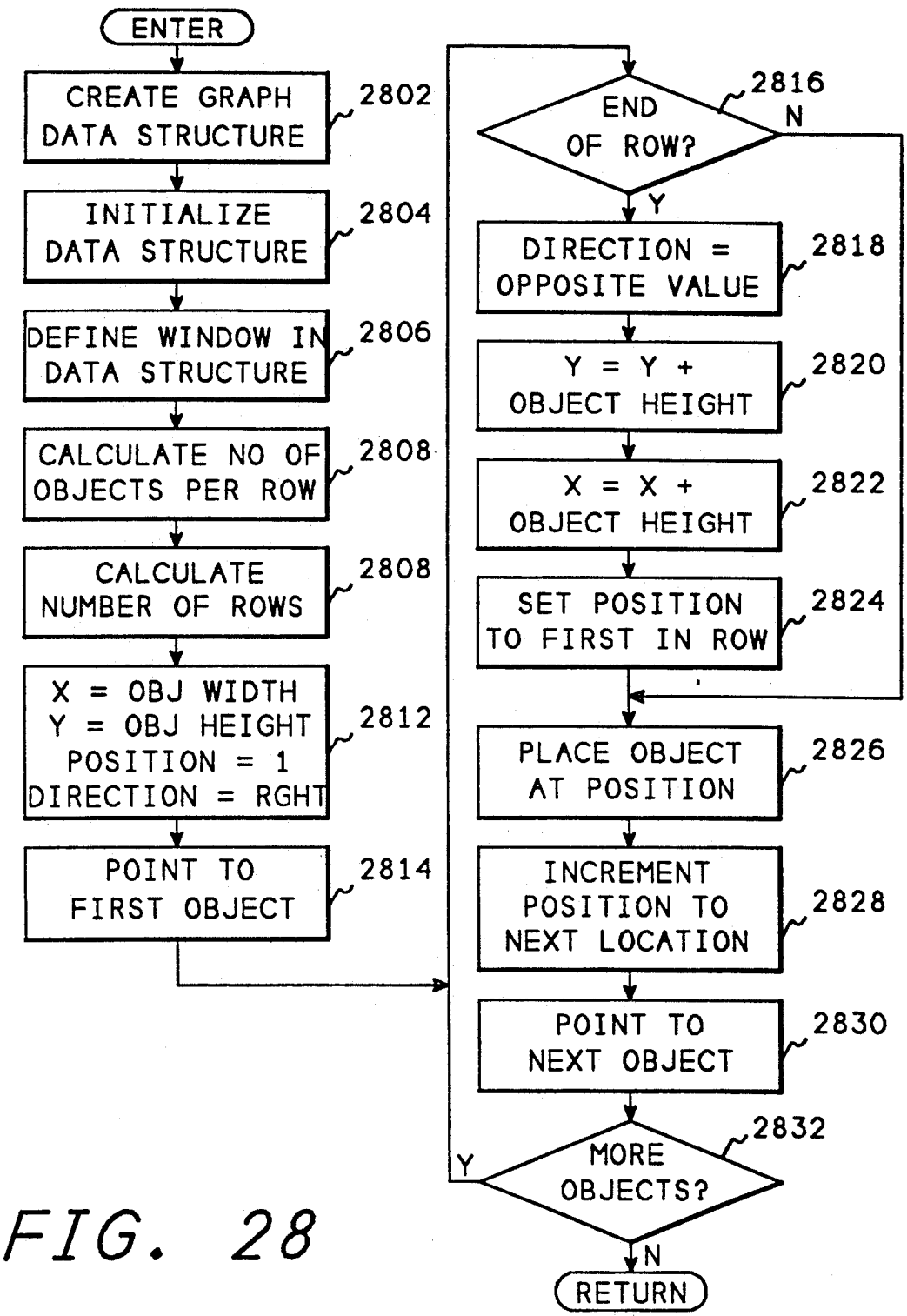
FIG. 28 is a flowchart of the layout bus view module of the system.

FIG. 28 shows a flowchart of the layout of a bus view of a network segment. Referring now to FIG. 28, after entry, block 2802 creates a graph data structure for the network layout. Block 2804 then initializes the data structure, and block 2806 defines a window within the structure. Block 2808 then calculates the number of objects per row by dividing the width of the graph by the width of each individual node. Block 2810 then determines the number of rows by dividing the number of objects to be placed by the number of objects per row. Block 2812 then sets the X coordinate to the width of an object, and the Y coordinate to the height of an object. It sets position to one and direction as right. Block 2814 then points to the first object to be placed, and block 2816 determines if the placement is at the end of a row. If the placement is at the end of a row, block 2816 transfers to block 2818 which sets the direction to the opposite of its current value. Block 2820 then sets a new Y coordinate value to the old Y coordinate value plus the height of an object. Block 2822 then increments the value of the X coordinate to point to the next row, and block 2824 sets the position to the first in a row or the last in a row depending on the current direction. If the positioning is not at the end of a row, or after setting all the new values, control goes to block 2826 which places the current object at the current position. Block 2828 then increments the position variable to the next location in a row, and block 2830 then points to the next object to be placed on the graph. Block 2832 determines if there are more objects to be placed, and if so, returns control to block 2816. After all objects have been placed, block 2832 returns to FIG. 26.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A computer implemented method for displaying, on a graphic output device connected to a computer system, a plurality of graphic objects, wherein each said graphic object has zero, one or a plurality of connecting lines that connect said graphic object to other graphic objects, said method comprising the steps of:
   (a) programmatically placing said graphic objects into a graph and assigning each said graphic object to one of a plurality of vertices of said graph;
   (b) programmatically placing said connecting lines into said graph and assigning each said connecting line to one of a plurality of edges of said graph, whereby a vertex is said to have an edge if said vertex has one or more connecting lines to other vertices;
   (c) programmatically dividing said vertices into clusters comprising the steps of
      (c1) temporarily removing one of said edges,
      (c2) starting from each of said vertices, programmatically examining each of said edges to programmatically determine if all said vertices are connected through one or more of said edges,
      (c3) if one or more vertices is determined by step (c2) to not be connected, collecting said one or more not connected vertices into a separate cluster, and
      (c4) repeating steps (c1) through (c3) for said separate cluster;
   (d) programmatically arranging each of said vertices within each of said clusters on said graph;
   (e) programmatically arranging said clusters on said graph;
   (f) displaying said graph on said graphic output device; and
   (g) moving a selected one of said graphic objects in response to each move request entered through a graphical input device.

2. The process of claim 1 wherein the following step is performed between steps (b) and (c):
   programmatically collecting all vertices having zero edges into a cluster and designating said cluster as an orphan cluster.

3. The process of claim 1 wherein the following steps are performed between steps (b) and (c):
   (b1) temporarily removing all vertices having one edge; and
   (b2) repeating step (b1) until no vertices with one edge remain in said graph.

4. The process of claim 3 wherein step (d) comprises the steps of:
   (d1) defining a circle with a circumference large enough to graphically contain all vertices of a first of said clusters;
   (d2) selecting a first of said vertices to place at a first location on said circumference of said circle;
   (d3) selecting a second of said vertices to place at a next location on said circumference comprising the steps of
      (d3a) locating one of said remaining vertices having an edge connecting to said first vertex,
      (d3b) if no vertex having said connection is found in step (d3a), selecting any remaining unplaced vertex, and
   (d4) repeating step (d3) until all said vertices of said cluster have been placed on said circumference.

5. The process of claim 4 wherein step (d1) further comprises the following steps performed prior to defining said circle:
   (d1a) selecting a vertex having exactly two edges;
   (d1b) marking said selected vertex for placement outside of said circumference of said circle; and
   (d1c) repeating steps (d1a) through (d1b) until no more unmarked vertices having exactly two edges remain in said cluster.

6. The process of claim 4 further comprising the step of reintroducing said vertices removed in steps (b1) and (b2) and placing said reintroduced vertices outside said circumference of said circle and adjacent said vertex to which said reintroduced vertices were originally connected.

7. The process of claim 1 wherein step (d) comprises the steps of:
   (d1) defining a circle with a circumference large enough to graphically contain all vertices of a first of said clusters;
   (d2) selecting a first of said vertices to place at a first location on said circumference of said circle;
   (d3) selecting a second of said vertices to place at a next location on said circumference comprising the steps of
      (d3a) locating one of said remaining vertices having an edge connecting to said first vertex,
      (d3b) if no vertex having said connection is found in step (d3a), selecting any remaining unplaced vertex, and
   (d4) repeating step (d3) until all said vertices of said cluster have been placed on said circumference.

8. The process of claim 7 wherein step (d1) further comprises the following steps performed prior to defining said circle:
   (d1a) selecting a vertex having exactly two edges;
   (d1b) marking said selected vertex for placement outside of said circumference of said circle; and
   (d1c) repeating steps (d1a) through (d1b) until no more unmarked vertices having exactly two edges remain in said cluster.

9. The process of claim 1 wherein step (e) further comprises arranging said clusters into a row and column format.

10. The process of claim 1 further comprises arranging a new graphic object on said graph each time said new graphic object is programmatically placed into said graph.

11. The process of claim 10 further comprising the steps of:
   determining if a user has requested an autolayout function;
   if autolayout has been requested, repeating steps (a) through (f) each time said new graphic object can be loaded; and
   if autolayout has not been requested, placing said new graphic object in a holding area on said graphic output device each time said new graphic object can be loaded.

12. The process of claim 11 further comprising the step of rescaling said graph if autolayout has been requested and said new graphic object could not be placed within bounds imposed by said graphic output device.

13. A computer implemented method of displaying, on a graphic output device attached to a computer system, a view of a computer internetwork comprising the steps of:
   (a) programmatically assigning each network within said internetwork to one of a plurality of vertices in a graph stored in said computer system;
   (b) programmatically assigning each gateway in said internetwork to one of said plurality of vertices of said graph and programmatically collecting all vertices having zero edges into a cluster and designating said cluster as an orphan cluster;
   (c) programmatically assigning each connection between said vertices to one of a plurality of edges in said graph, whereby a vertex is said to have an edge if said vertex has one or more connections to other vertices;
   (d) programmatically dividing said vertices into clusters comprising the steps of
   (d1) temporarily removing one of said edges,
   (d2) starting from each of said vertices, programmatically examining each of said edges to programmatically determine if all said vertices are connected through one or more of said edges,
   (d3) if one or more vertices is determined by step (d2) to not be connected, collecting said one or more not connected vertices into a separate cluster, and
   (d4) repeating steps (d1) through (d3) for said separate cluster;
   (e) programmatically arranging each of said vertices within each of said clusters on said graph;
   (f) programmatically arranging said clusters on said graph; and
   (g) displaying said graph on said graphic output device.

14. The process of 13 wherein step (b) further comprises the steps of:
   (b1) temporarily removing all vertices having one edge; and
   (b2) repeating step (b1) until no vertices with one edge remain in said graph.

15. The process of claim 14 wherein step (e) comprises the steps of:
   (e1) defining a circle with a circumference large enough to graphically contain all vertices of a first of said clusters;
   (e2) selecting a first of said vertices to place at a first location on said circumference of said circle;
   (e3) selecting a second of said vertices to place at a next location on said circumference comprising the steps of
   (e3a) locating one of said remaining vertices having an edge connecting to said first vertex,
   (e3b) if no vertex having said connection is found in step (e3a), selecting any remaining unplaced vertex, and
   (e4) repeating step (e3) until all said vertices of said cluster have been placed on said circumference.

16. The process of claim 15 wherein step (e1) further comprises the following steps performed prior to defining said circle:
   (e1a) selecting a vertex having exactly two edges;
   (e1b) marking said selected vertex for placement outside of said circumference of said circle; and
   (e1c) repeating steps (d1a) through (d1b) until no more unmarked vertices having exactly two edges remain in said cluster.

17. The process of claim 15 further comprising the step of reintroducing said vertices removed in steps (b1) and (b2) and placing said reintroduced vertices outside said circumference of said circle and adjacent said vertex to which said reintroduced vertices were originally connected.

18. The process of claim 13 wherein step (e) comprises the steps of:
   (e1) defining a circle with a circumference large enough to graphically contain all vertices of a first of said clusters;
   (e2) selecting a first of said vertices to place at a first location on said circumference of said circle;
   (e3) selecting a second of said vertices to place at a next location on said circumference comprising the steps of
   (e3a) locating one of said remaining vertices having an edge connecting to said first vertex,
   (e3b) if no vertex having said connection is found in step (e3a), selecting any remaining unplaced vertex, and
   (e4) repeating step (e3) until all said vertices of said cluster have been placed on said circumference.

19. The process of claim 18 wherein step (e1) further comprises the following steps performed prior to defining said circle:
   (e1a) selecting a vertex having exactly two edges;
   (e1b) marking said selected vertex for placement outside of said circumference of said circle; and
   (e1c) repeating steps (d1a) through (d1b) until no more unmarked vertices having exactly two edges remain in said cluster.

20. The process of claim 13 wherein step (f) further comprises arranging said clusters into a row and column format.

21. The process of claim 13 wherein step (a) further comprises arranging a new vertex on said graph each time a network is programmatically assigned to a vertex.

22. The process of claim 21 further comprising the steps of:
   determining if an autolayout function has been requested by a user of a said computer system;
   if autolayout has been requested, repeating steps (a) through (f) each time said new vertex can be loaded; and
   if autolayout has not been requested, placing said new vertex in a holding area on said graphic output device each time said new vertex can be loaded.

23. The process of claim 22 further comprising the step of rescaling said graph if autolayout has been requested and said new vertex could not be placed within bounds imposed by said graphic output device.

24. The process of claim 13 further comprising the step of moving a selected one of said vertices in response to each move request entered through a graphical input device attached to said computer system.

25. A computer implemented method of displaying, on a graphic output device attached to a computer system, a view of a computer network comprising the steps of:
- (a) programmatically assigning each segment within said internetwork to one of a plurality of vertices of a graph;
- (b) programmatically assigning each connection between said vertices to one of a plurality of edges of said graph, whereby a vertex is said to have an edge if said vertex has one or more connections to other vertices;
- (c) programmatically dividing said vertices into clusters comprising the steps of
  - (c1) temporarily removing one of said edges,
  - (c2) starting from each of said vertices, programmatically examining each of said edges to programmatically determine if all said vertices are connected through one or more of said edges,
  - (c3) if one or more vertices is determined by step (c2) to be unconnected, collecting said one or more not connected vertices into a separate cluster, and
  - (c4) repeating steps (c1) through (c3) for said separate cluster;
- (d) programmatically arranging each of said vertices within each of said clusters on said graph;
- (e) programmatically arranging said clusters into a row and column format on said graph; and
- (f) displaying said graph on said graphic output device.

26. The process of claim 25 wherein step (b) further comprises the step of:
- (b1) programmatically collecting all vertices having zero edges into a cluster an designating said cluster as an orphan cluster.

27. The process of 25 wherein step (b) further comprises the steps of:
- (b1) temporarily removing all vertices having one edge; and
- (b2) repeating step (b1) until no vertices with one edge remain in said graph.

28. The process of claim 27 wherein step (d) comprises the steps of:
- (d1) defining a circle with a circumference large enough to graphically contain all vertices of a first of said clusters;
- (d2) selecting a first of said vertices to place at a first location on said circumference of said circle;
- (d3) selecting a second of said vertices to place at a next location on said circumference comprising the steps of
  - (d3a) locating one of said remaining vertices having an edge connecting to said first vertex,
  - (d3b) if no vertex having said connection is found in step (d3a), selecting any remaining unplaced vertex, and
- (d4) repeating step (d3) until all said vertices of said cluster have been placed on said circumference.

29. The process of claim 28 wherein step (d1) further comprises the following steps performed prior to defining said circle:
- (d1a) selecting a vertex having exactly two edges;
- (d1b) marking said selected vertex for placement outside of said circumference of said circle; and
- (d1c) repeating steps (d1a) through (d1b) until no more unmarked vertices having exactly two edges remain in said cluster.

30. The process of claim 29 further comprising the step of reintroducing said vertices removed in steps (b1) and (b2) and placing said reintroduced vertices outside said circumference of said circle and adjacent said vertex to which said reintroduced vertices were originally connected.

31. The process of claim 25 wherein step (d) comprises the steps of:
- (d1) defining a circle with a circumference large enough to graphically contain all vertices of a first of said clusters;
- (d2) selecting a first of said vertices to place at a first location on said circumference of said circle;
- (d3) selecting a second of said vertices to place at a next location on said circumference comprising the steps of
  - (d3a) locating one of said remaining vertices having an edge connecting to said first vertex,
  - (d3b) if no vertex having said connection is found in step (d3a), selecting any remaining unplaced vertex, and
- (d4) repeating step (d3) until all said vertices of said cluster have been placed on said circumference.

32. The process of claim 31 wherein step (d1) further comprises the following steps performed prior to defining said circle:
- (d1a) selecting a vertex having exactly two edges;
- (d1b) marking said selected vertex for placement outside of said circumference of said circle; and
- (d1c) repeating steps (d1a) through (d1b) until no more unmarked vertices having exactly two edges remain in said cluster.

33. The process of claim 25 wherein step a further comprises programmatically arranging a new vertex on said graph each time a segment is assigned to said new vertex.

34. The process of claim 33 further comprising the steps of:
determining if an autolayout function has been requested by a user of said computer system;
if autolayout has been requested, repeating steps (a) through (f) each time said new vertex can be loaded; and
if autolayout has not been requested, placing said new vertex in a holding area on said graphic output device each time said new vertex can be loaded.

35. The process of claim 34 further comprising the step of rescaling said graph if autolayout has been requested and said new vertex could not be placed within bounds imposed by said graphic output device.

36. The process of claim 25 further comprising the step of moving a selected one of said vertices in response to each move request entered through a graphical input device attached to said computer system.

* * * * *